US 8,379,532 B2

(12) United States Patent
Griff et al.

(10) Patent No.: US 8,379,532 B2
(45) Date of Patent: Feb. 19, 2013

(54) WEB SERVER AND METHOD FOR HOSTING A WEB PAGE FOR PRESENTING LOCATION BASED USER QUALITY DATA RELATED TO A COMMUNICATION NETWORK

(75) Inventors: Paul Griff, Bellevue, WA (US); Ron Dicklin, Kirkland, WA (US); Jason Browne, San Mateo, CA (US)

(73) Assignee: Root Wireless, Inc., Bellevue, WA (US)

( * ) Notice: Subject to any disclaimer, the term of this patent is extended or adjusted under 35 U.S.C. 154(b) by 299 days.

(21) Appl. No.: 12/574,655

(22) Filed: Oct. 6, 2009

(65) Prior Publication Data

US 2010/0091677 A1 Apr. 15, 2010

Related U.S. Application Data

(60) Provisional application No. 61/103,141, filed on Oct. 6, 2008.

(51) Int. Cl.
*H04L 12/26* (2006.01)
(52) U.S. Cl. .............. 370/252; 370/338; 709/224
(58) Field of Classification Search ............ 370/252, 370/253, 328–338; 455/456.1–457; 709/223–226
See application file for complete search history.

(56) References Cited

U.S. PATENT DOCUMENTS

| 6,516,189 | B1 | 2/2003 | Frangione et al. |
| 6,560,442 | B1 | 5/2003 | Yost et al. .................... 455/67.1 |
| 6,745,011 | B1 | 6/2004 | Hendrickson et al. |
| 6,754,470 | B2 | 6/2004 | Hendrickson et al. |
| 6,757,543 | B2 | 6/2004 | Moran et al. .............. 455/456.1 |
| 6,788,926 | B1 | 9/2004 | Frangione et al. |
| 6,807,515 | B2 | 10/2004 | Vogel et al. |
| 6,928,280 | B1 | 8/2005 | Xanthos et al. |
| 7,013,136 | B2 | 3/2006 | Frangione et al. |
| 7,295,119 | B2 | 11/2007 | Rappaport et al. ......... 340/572.4 |
| 7,299,277 | B1 | 11/2007 | Moran et al. .................. 709/224 |
| 7,392,017 | B2 * | 6/2008 | Chu et al. ...................... 370/253 |
| 2002/0069037 | A1 | 6/2002 | Hendrickson et al. ....... 702/186 |
| 2005/0182847 | A1 * | 8/2005 | Pirzada et al. ................ 709/233 |
| 2006/0007870 | A1 | 1/2006 | Roskowski et al. .......... 370/252 |
| 2006/0294260 | A1 | 12/2006 | Young et al. |
| 2008/0031277 | A1 | 2/2008 | Walter et al. |
| 2009/0138427 | A1 | 5/2009 | Kalavade ......................... 707/1 |
| 2009/0195377 | A1 | 8/2009 | Chang |
| 2009/0233611 | A1 | 9/2009 | Olsson et al. ................. 455/446 |
| 2009/0310501 | A1 | 12/2009 | Catovic et al. ................ 370/252 |
| 2010/0087188 | A1 | 4/2010 | Griff et al. .................... 455/424 |
| 2010/0091677 | A1 | 4/2010 | Griff et al. |
| 2010/0094930 | A1 | 4/2010 | Griff et al. .................... 709/203 |
| 2010/0248640 | A1 | 9/2010 | MacNaughtan et al. ... 455/67.11 |
| 2011/0044193 | A1 | 2/2011 | Forenza et al. ............... 370/252 |
| 2011/0106942 | A1 | 5/2011 | Roskowski et al. .......... 709/224 |

* cited by examiner

*Primary Examiner* — Pao Sinkantarakorn

(74) *Attorney, Agent, or Firm* — Seed IP Law Group PLLC

(57) ABSTRACT

A web-server communicates wireless networking performance data that reflects the true user experience of a mobile device operating in a particular location and operating on a particular wireless network.

12 Claims, 11 Drawing Sheets

WEB SERVER AND METHOD FOR HOSTING A WEB PAGE FOR PRESENTING LOCATION BASED USER QUALITY DATA RELATED TO A COMMUNICATION NETWORK

CROSS-REFERENCE TO RELATED APPLICATION

This application claims the benefit under 35 U.S.C. §119 (e) of U.S. Provisional Patent Application No. 61/103,141 filed Oct. 6, 2008, where this provisional application is incorporated herein by reference in its entirety.

BACKGROUND

1. Technical Field

Embodiments of a web server host a web page that delivers information to users, the information related to the performance quality of a wireless communication network.

2. Description of the Related Art

Wireless network providers conventionally use relatively complex, expensive, private and inflexible methods for collecting information about the quality of their wireless network. More particularly, network providers use large vehicles outfitted with special equipment connected to groups of mobile phones and specialized network monitoring analyzers The data collected by network providers generally does not reflect a true user experience. Frequently, the data collected is theoretical data. In other cases, instead of true user data, the collected data is at best a representation of the results of particular tests executed by the test operator. In addition, the test equipment used is specialized for performing the tests specified by the network provider, and the collected data is often very complex. The resulting complex test information is often not available to the end user or to the general public.

BRIEF SUMMARY

A web-server is taught. The web-server communicates wireless networking performance data that reflects the true user experience of a mobile device operating in a particular location and on a particular wireless network. According to one embodiment, the web-server interactively communicates wireless networking performance data. The web-server communicates a first set of screen data to a computing device, the first set of screen data soliciting user input. The web-server receives user input information from the computing device, and the user input information includes an identified geographical location, an identified wireless communication network operator, and at least one key performance indicator (KPI) representative of a user experience of the computing device operating in the identified geographical location on a wireless network operated by the identified wireless communication network operator.

The web-server retrieves wireless networking performance data corresponding to the KPI in the identified geographical area on the wireless network. The web-server then communicates a second set of screen data having a visual representation of a geographical area corresponding to the identified geographical location and a third set of screen data to overly the visual representation of the geographical area corresponding to the identified geographical location wherein the third set of screen data includes the retrieved wireless networking performance data.

According to one embodiment, a web-server method for interactively communicating wireless networking performance data is taught. The method includes the step of outputting, with a first computing device to a second computing device, a first set of screen data. The first set of screen data solicits user input. The method also includes the step of receiving, at the first computing device from the second computing device, user input information in response to the solicitation. The user input information includes an identified geographic location, an identified wireless communication network operator, and at least one key performance indicator representative of performance quality of a mobile device previously operated in the identified geographic location on a wireless communication network. The wireless network is controlled by the identified wireless communication network operator. The method also includes the step of outputting, with the first computing device to the second computing device, a second set of screen data. The second set of screen data presents a measurement commensurate with the user input information.

According to another embodiment, a computer readable medium has content that the web-server to execute the method steps.

According to another method, a web-server device for interactively communicating wireless networking performance data has a central processing unit (CPU) and a memory having software. The software is executable by the CPU and operable to execute the method steps.

According to one embodiment, a method of processing wireless networking performance data is taught. The method includes the step of retrieving a set of geographically based wireless networking performance data from a first computing device. The set of geographically based wireless networking performance data is derived from at least one mobile device provisioned for typical operation on a wireless communication network. The method also includes the step of parsing the steps of geographically based wireless networking performance data according to a set of key performance indicators and calculating a geographically based composite score representative of wireless networking performance quality from at least some of the key performance indicators. Finally, the method includes the step of formatting the composite score for display on an output device.

According to one embodiment, a computing server is taught. The computing server has a central processing unit (CPU), an input/output port, and a memory associated with the computing server. The memory is configured to store a software application, and the software application is configured to receive, via the input/output port, a set of key performance indicators representative of at least one user experience of a mobile device previously operated in an identified geographic location on a wireless communication network. The software application is also configured to calculate with the CPU, a geographically based composite score representative of wireless networking performance quality from at least some of the key performance indicators in the set and format the composite score for output.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
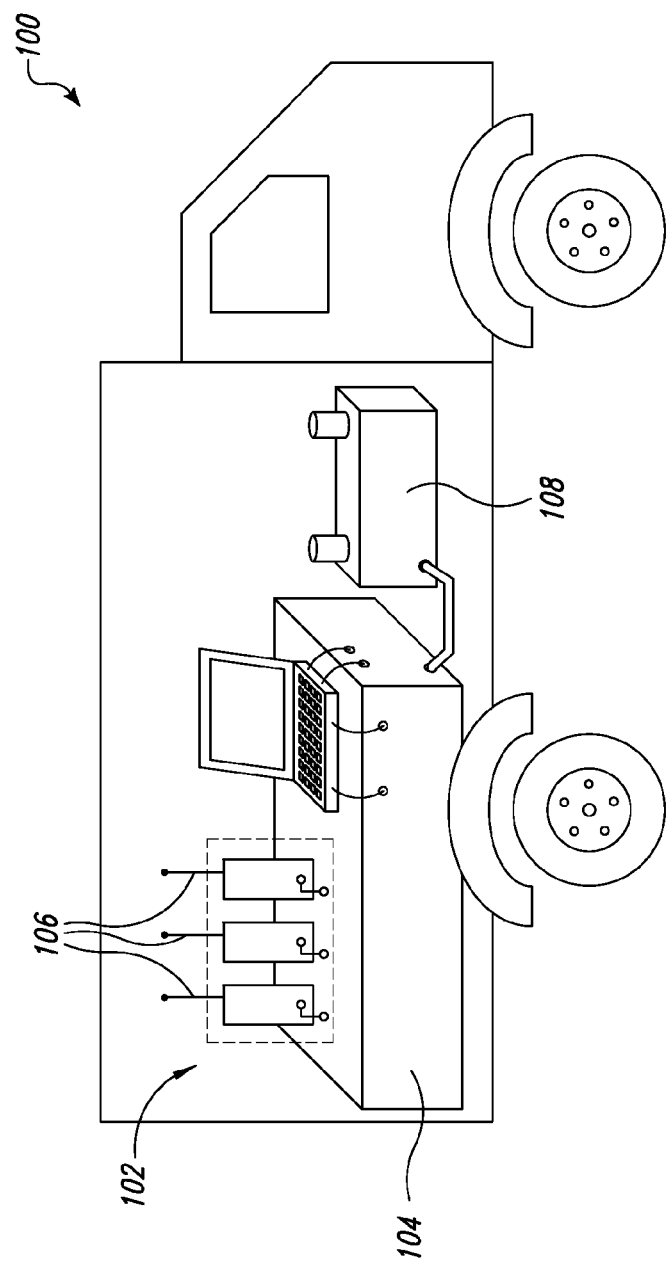
FIG. 1 illustrates a data gathering system conventionally used in the prior art to collect communication network performance data.

People use mobile communication devices for business, pleasure, safety, and many other reasons. Many conventional mobile devices are used both for voice communications as well as for data communications. For example, people use their mobile devices to talk to other people, to interact with Internet web pages on mobile devices, to send and receive text messages, to receive geographical positioning information, and many other things. Accordingly, the quality of the wireless network connection and usability of the mobile device are very important to people.

The people that use mobile communication devices refer to the underlying telecommunications network with a wide variety of names. For example, the wireless communication network referenced herein may alternatively be known as a wireless network, a cellular network, a mobile network, and any combination of same or similar words. The term network as used herein is intended to broadly encompass any wireless communications network.

The operators of the wireless communications network permit some mobile devices to access and communicate over the wireless communications network. Generally, users of mobile devices pay the operators for using the wireless communications network. The operators are referenced herein as network providers, service providers, owners, carriers, and any combination of same or similar words.

The users of mobile devices that communicate via the wireless communications network include individuals and other computing devices. The mobile devices and users of the mobile devices are interchangeably referenced herein as users, mobile devices, clients, cell phones, and any combination of same or similar words.

One quality of the wireless connection is the network signal strength in a particular geographical area. This quality is a factor that directly affects the perceived usefulness, efficiency, and overall wireless network experience provided by the mobile device. In some cases, people inconveniently alter their schedules and their locations particularly to improve their wireless network experience. Accordingly, some mobile devices have some type of 'signal strength' indicator, and wireless network providers use this to try to differentiate their quality of service from that of their competitors.

Other factors that affect a user's perception of quality include battery life, audio quality, propensity of the device to not drop calls, ability to make and receive calls in remote and/or densely urban areas, accessibility to data services, technology level of data services, and the like. In many cases, the user determines the likelihood of being satisfied in these factors based on the signal strength indicator regardless of whether or not the indicator has any relation to the factors.

Wireless network providers collect data for many reasons. One reason is to generate tangible results to support their 'quality of service' marketing efforts. The data collected by the network providers is typically complex and not readily available to consumers. In some cases, the data collected by the network providers is merely theoretical, and in other cases, the data is gathered with specialized test equipment.

Wireless network operators usually display their theoretical and/or gathered quality information in simplified form on graphical maps. The graphical maps are often only found on the particular network carrier's website. The graphical maps are marketing tools for the network carrier. The graphical maps are often simplified to provide to users an understanding or estimate of how the operator's network may perform at a particular location. In some cases the limited information is merely signal strength and/or a listing of the type of data connections that are made available. In other cases, there is even less information.

FIG. 1 illustrates a data gathering system 100 conventionally used to collect communication network performance data. The system 100 generally comprises a large vehicle, such as a van or truck, carrying a collection of test equipment. Several wireless devices 102 are coupled to electronic data collection devices 104. Respective antennas 106 are tuned in various configurations and also coupled to wireless devices 102 or the electronic data collection devices 104. The antennas 106 are operable to transmit and/or receive communication signals from one or more wireless communication networks. A power source 108 is used as a power supply for all of the test equipment.

In some cases, the wireless devices 102 are generally available, retail cellular phones, and at least some of the retail cellular phones may be configured with specific a software program added for the test operator. In such cases, the software program is custom designed and operable to execute a particular test desired by the test operator. For example, the program may put the cellular phone in a predetermined state, which facilitates testing. Even in these cases, however, the mobile devices have nevertheless been customized specifically for the industrialized testing environment of data gathering system 100.

In other cases, the wireless devices 102 are customized wireless equipment specifically used to facilitate testing. These wireless devices may have electronic hardware and software used to transmit known signal patterns, receive particular frequencies, and collect specific wireless communication network data.

The power source 108 in the data gathering system 100 is supplied by the on-board vehicle power system and is used to supply power for all of the system 100 test equipment. The vehicle's DC power is tapped and isolated to be a test equipment power source for power source 108. The test equipment power source provides one or more power supplies for individual pieces of test equipment. The supplies are stepped up or down as necessary and regulated for each of the test equipment devices. In some cases, one of the individual supplies is further modified from a DC power source to provide AC power for conventional 110 VAC test equipment.

The purpose of the conventional power source 108 is to provide an unlimited supply of power to satisfy the demands of the test equipment. The conventional data gathering system 100 is not concerned with power saving or power consumption and so in the conventional data gathering system 100, power measurement factors are not considered. Since power supply is not one of the variables to be tested, efforts are made to make it as constant as possible. It is designed in the data gathering system 100 for power source 108 to be an unseen, unnoticed part of the test equipment.

Figure 2:
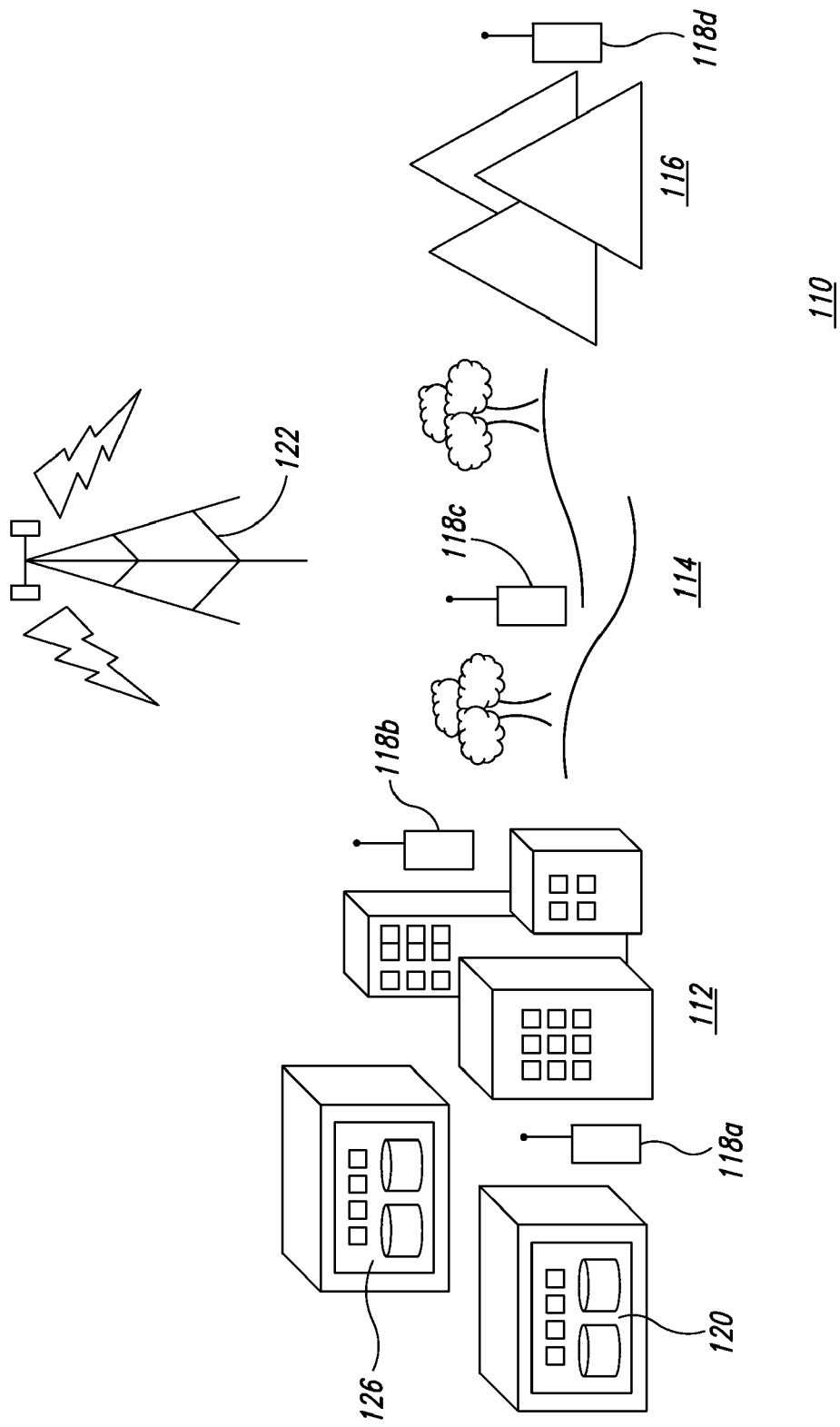
FIG. 2 illustrates a wireless network performance measurement system according to one embodiment of the invention.

FIG. 2 illustrates a new wireless network performance measurement system 110. Metropolitan areas 112, rural areas 114, and mountainous areas 116, are among the many areas where consumers use wireless communication devices. A cellular communication network 122 provides cellular service to each of these areas, albeit with widely differing quality. That is, to some degree, every area served by cellular network 122 is subject to low signal strength, sporadic network outages, poor communication quality, dropped calls, and a host of other problems broadly identified as "low user quality."

Cellular communication network 122 may be any available network suitable for transmitting and receiving data between mobile and/or fixed point devices, or the cellular network 122 may be dedicated to a primary purpose of delivering the information to known subscribers. Cellular communication network 122 may include both wired and wireless infrastructure; for example, transceivers, repeaters, switches, antennas, routers, public switched telephone networks, codecs, multiplexers, de-multiplexers, and the like.

Often, but not always, the hardware used to implement a particular network 122 is dedicated to a particular type of wireless network technology. For example, some technologies include Global System for Mobile Communications (GSM), General Packet Radio Service (GPRS), Enhanced Data Rates for GSM Evolution (EDGE), Code Division Multiple Access (CDMA), Universal Mobile Telecommunication System (UMTS) High Speed Downlink Packet Access (HSDPA), Evolution-Data Optimized (EV-DO), integrated Digital Enhanced Network (iDEN), Worldwide Interoperability for Microwave Access (WiMax), various 802.11 standards (WiFi), femtocells, satellite-based communications, and many others now or later developed. These technologies may share components or they may have infrastructure dedicated to their type of technology. The combination of each of the elements of the wireless network contributes to the quality or lack of quality of the wireless network 122.

Dispersed throughout the metropolitan, rural, and mountainous areas 112-116, a plurality of individual mobile devices 118a-d are operated in a manner typified by an average cellular service customer having access to contracted wireless network services. In some cases, the cellular service customer is an individual user, and in other cases, the customer is a business entity that provides the mobile device to a representative. In either case, the mobile devices 118a-d are provisioned for typical operation on a wireless communication network.

Each of the identified mobile devices 118a-d of FIG. 2 is outfitted with a software program used to collect selected cellular network, geographical, and device test data. Data collection by the mobile devices 118a-d is directed by a server 120 in a central office.

The central office may have one or more servers 120. In some cases, several servers 120 are used to provide redundant operations, which improve the robustness of the data gathering operation. In some cases, several servers 120 are used to communicate with a large number of mobile devices 118a-d. Additionally, the one or more central offices may be located in dense, urban locations or in remote, rural locations.

Server 120 sends wireless communication instructions to the mobile devices 118a-d directing each device to collect and transmit test data back to the central office server 120. Embodiments of mobile devices 118a-d are disclosed in a corresponding U.S. Provisional Patent Application bearing No. 61/103,174, filed Oct. 6, 2008, and a corresponding U.S. Utility patent application, filed Oct. 6, 2009, each entitled "MOBILE DEVICE AND METHOD FOR COLLECTING LOCATION BASED USER QUALITY DATA," and each naming each of the inventors of the present application, filed concurrently and incorporated by reference in their entirety.

Server 120 sends wireless communication instructions to the mobile devices 118a-d directing each device to collect and transmit test data back to the central office server 120. Embodiments of server 120 are disclosed in a U.S. Provisional Patent Application bearing No. 61/103,160, filed Oct. 6, 2008, and a corresponding U.S. Utility patent application, filed Oct. 6, 2009, each entitled "SERVER DEVICE AND METHOD FOR DIRECTING MOBILE DEVICES TO COLLECT AND COMMUNICATE LOCATION BASED USER QUALITY DATA," and each naming each of the inventors of the present application, filed concurrently and incorporated by reference in their entirety.

Figure 3:
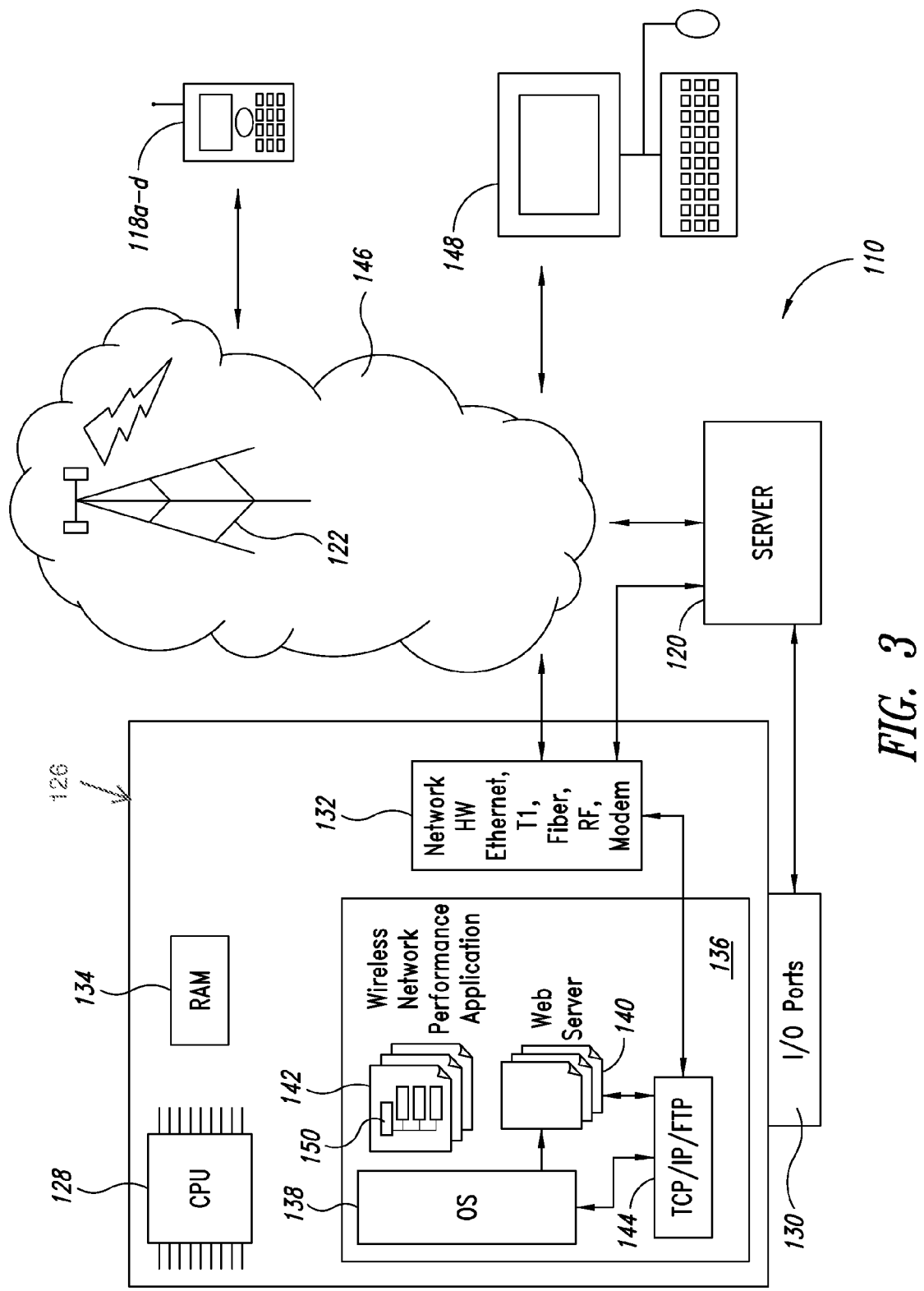
FIG. 3 illustrates a web server in greater detail in another embodiment of the wireless network performance measurement system.

FIG. 3 illustrates web server 126 in greater detail in another embodiment of the wireless network performance measurement system 110. Web server 126 has operative electronic circuitry including a central processing unit 128 (CPU), multiple input/output (I/O) ports 130, a high bandwidth network connectivity port 132, volatile memory 134 (RAM), and non-volatile memory 136. Memory 136 is any non-volatile computer-readable media including, for example, flash memory, magnetic media such as a hard-disk, an optical disk drive, a floppy diskette, a CD-ROM, and/or the like.

As known by one skilled in the art, the memories 134, 136 comprise any combination of volatile and non-volatile computer-readable media for reading and writing. In some cases, a particular memory is separated virtually or physically into separate areas, such as a first memory, a second memory, a third memory, etc. In these cases, it is understood that the different divisions of memory may be in different devices or embodied in a single memory.

In a preferred embodiment of FIG. 3, within the memory 136, several software programs are resident including an operating system 138, a web server application 140, a wireless network performance software application 142, and an intermediary networking software application 144.

The CPU 128 of the web server 126 retrieves and executes instructions from memory 136 and/or RAM 134. The operating system 138 includes application and driver software that permits additional application software and system administrators to control the operation of server 126. For example, particular applications and drivers are used to accept user input and to provide system output through I/O ports 130. That is, keypads, computer mice, memory cards, serial ports, bio-sensor readers, touch screens, and the like are all useful to a system administrator or other web-server operator to provide control information into the web server 126. Displays, printers, memory cards, LED indicators, speakers, and the like are all useful to present output information to the web-server operator.

In addition to application and driver software within the operating system 138, operating system 138 hosts a web server 140 application. In one embodiment, the web server application 140 is a Microsoft Internet Information Services web server. The web server application hosts particular static and dynamic web pages (e.g., screen data) such that users of the Internet are capable of interactively viewing. The wireless networking performance application 142 described herein includes web pages hosted by the web server application 140.

The intermediary networking software application 144 is a collection of one or more software programs that provide connectivity to computing resources outside of the web-server 126. For example, conventional transmission control protocol/Internet protocol (TCP/IP), file transfer protocol (FTP), user datagram protocol (UDP), and the like are useful to permit data such as web pages to be served to the outside computing resources, and further are useful to permit users of the outside computing resources to input data into the web server 126. That is, the operating system 138 and web server application 140 are bi-directionally coupled to the intermediary networking software application 144 and the intermediary networking software application 144 is bi-directionally coupled to individual circuits of the high bandwidth network connectivity port 132. The bi-directional coupling permits the web server application to solicit a user for input information, accept the user information, and output wireless networking performance data as screen data, screen updates, audio data or the like, commensurate with the user input information.

The high bandwidth network connectivity port 132 includes electronic networking circuits such as a Digital Signal 1 (T1), Digital Signal 3 (T3), fiber-optic, Ethernet, fax/modem, and other telecommunications circuits. The telecommunications circuits of the high bandwidth network connectivity port 132 provide the hardware layer interconnectivity of the web server 126, through a telecommunications network 146 to a wide range of outside computing resources.

The telecommunications network 146, which includes the cellular communication network 122, further includes conventional cable networks, satellite networks, fiber-optic networks, and the like. In a preferred embodiment, the telecommunications network 146 includes any communication hardware and software that cooperatively works to permit users of computing devices to view and interact with Internet web pages.

The outside computing resources include mobile devices 118*a-d*, conventional user computers 148, and even server 120. In a preferred embodiment, mobile devices 118*a-d* are directed by server 120 to collect real-time network performance data as the voice and computer data travels from and between other mobile devices, other web servers, and other user computers through the cellular network 122. The network performance data collected by the mobile devices 118*a-d* is communicated to server 120, where it is processed. The processed data is communicated by server 120 to web server 126. The web server 126 interactively presents the data to users of the mobile device 118*a-d*, other mobile devices, and user computers 148.

User computers 148 comprise one or more computing devices operating separately or in a networked environment. In some cases, user computer 148 is a conventional personal computer operated by a single user. In other embodiments, user computers 148 are network computers processing data for other industrial, commercial, or business purposes.

Resident in memory 136, the wireless networking performance application 142 embodies the software code of a wireless networking performance website 150. Generally speaking, the website 150 displays collected location based user quality cell phone performance metrics to users via the Internet. That is, the website 150 and the wireless networking performance application 142 work cooperatively to provide detailed, geographic location-based wireless network information and user experience quality data in a manner that compares the information across multiple, different cellular network operators and multiple, different mobile devices.

The user experience quality data that is presented on the website 150 is useful to users of the website 150 during their evaluation and comparisons of particular wireless cellular networks and particular mobile devices.

The user-experience quality data presented on website 150 includes helpful information regarding both voice communications and data communications of particular cellular networks and particular mobile devices. The data represents accurate information about end-user wireless network experiences, which has been collected from specific mobile devices 118*a-d*. The specific mobile devices 118*a-d* are running an application which accesses the wireless network information. The specific mobile devices 118*a-d* collect, process, and communicate the information, which is then presented on website 150 as key performance indicators (KPIs) representative of performance quality of the mobile devices 118*a-d* as they were previously operated in identified geographic location on the particular cellular networks.

Website 150 serves many purposes. For example website 150 presents realistic and accurate end user quality network KPI information related to each network cellular carrier that provides cellular network service in a particular geographic location. As another example, website 150 operates as a centralized website where consumers can access detailed information that pertains to mobile devices such as usage patterns, voice quality, battery life, dropped or interrupted connections, and the like. As another example, since website 150 provides so much information to consumers, a significant number of consumers will access website 150. And, since a significant number of consumers will access website 150, goods and services providers will pay to provide additional useful information such as advertising to the consumers.

Website 150 prominently displays information about the quality of the supported wireless cellular networks. A supported wireless cellular network is one from which mobile devices 118*a-d* collect data, the results of the data collection being presented on website 150. The displayed information reflects actual user experience on the particular wireless cellular network for a particular geographic location.

Many types of information related to a particular wireless cellular network are made available to consumers. Consumers are able to view comparative information from many wireless cellular networks on website 150. In addition, consumers are able to view comparative information from many different mobile device models. For example, some key performance indicators that are viewable on website 150 include network signal strength, upload data transfer speed, download data transfer speed, data latency, video quality, dropped calls, error messages, data technology transition, audio quality, and others.

In a preferred embodiment, users of website 150 wish to view the KPI details for a particular wireless cellular network in a particular location. The website 150 presents a first dialog box to the user, and the user enters a zip code or other location identifier such as a street address, state, or metro/city name. Website 150 will present information related to the location selected by the user. For example, the information presented may include the number of mobile devices collecting data in the geographic area, the times and dates when data is collected, the size, shape, elevation, urban density, and other factors related to the geographic area, the number, identity, and location of cell towers used by the particular wireless cellular network and their operational state, and other information. In some cases, website 150 may even show only the data collected by a particular identified mobile device 118*a-d*.

After information related to the selected area of interest is displayed, website 150 presents a second dialog box to the user. The second dialog box presents an opportunity for the user to select various wireless cellular network operators for which the user would like to view KPI details. Through a third dialog box presented by website 150, the user has an opportunity to select one or more KPIs for which website 150 will present specific data.

Figure 3A:
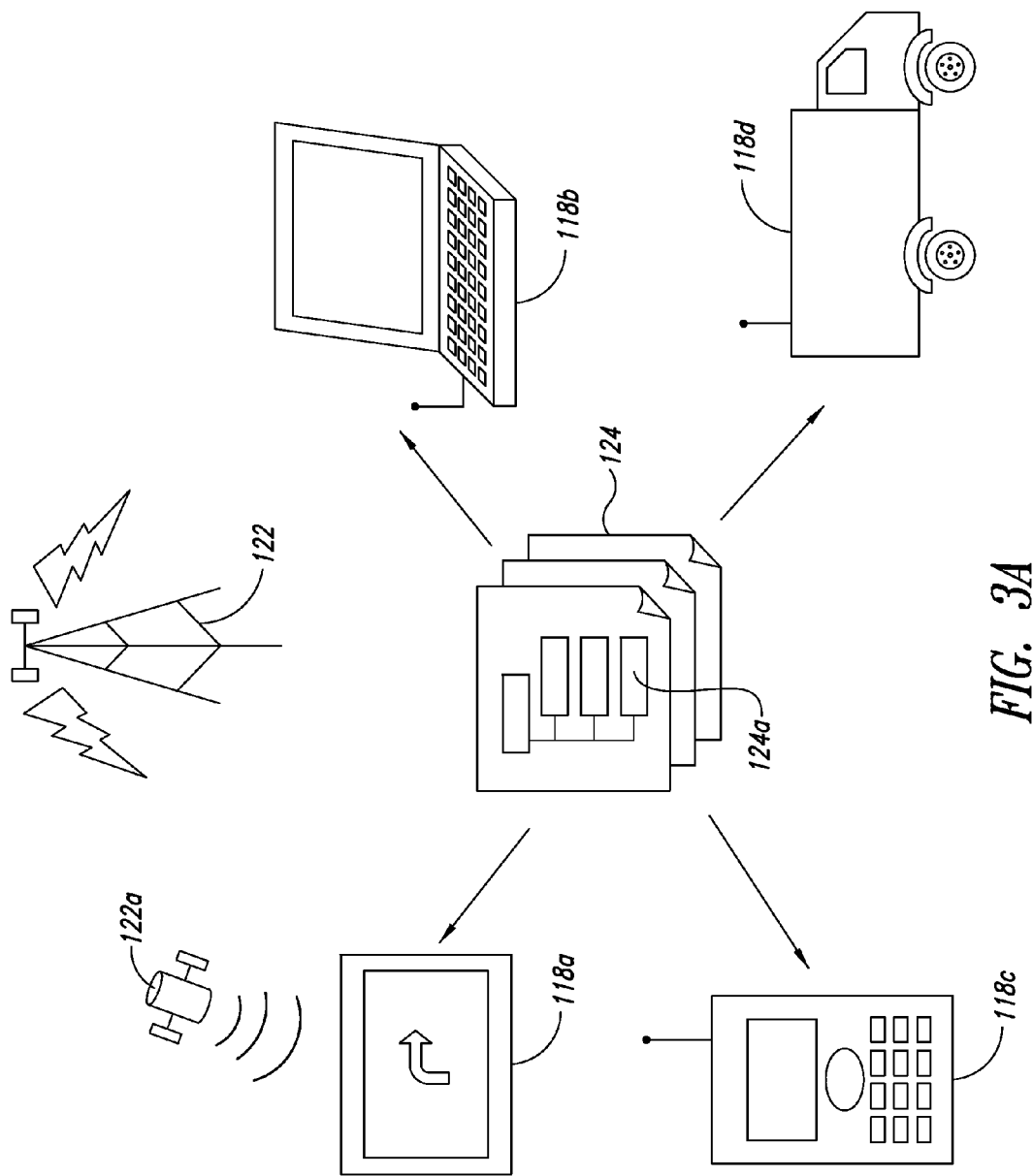
FIG. 3A illustrates examples of the mobile devices of FIG. 2.

FIG. 3A illustrates examples of the mobile devices 118a-d of FIG. 2. A handheld global positioning device 118a receives positioning information from a satellite network 122a and mapping information from a cellular network 122. A laptop computer 118b is outfitted with an external wireless card for sending and receiving voice and/or data over a cellular network 122. A mobile telephone 118c is most often used for voice and data communications on a cellular network 122. An automobile 118d commonly has cellular network 122 accessing capability for voice and data communications. The representative illustrations of FIG. 3A are merely non-limiting examples of the type of mobile wireless network client devices useful for collecting wireless network performance measurements. Many other client devices, including personal media players (PMP's), personal digital assistants (PDA's), handheld personal computers (HPC's), and the like can also be configured as described herein to collect network data. In fact, virtually any computing device with a compatible transceiver and proper configuration can be a mobile device 118a-d.

Also illustrated in FIG. 3A are a particular collection of software instructions 124. The software instructions 124, as described herein, are useful to direct the mobile devices 118a-d in collecting communication network performance quality data. Software instructions also have a configuration data file 124a, which is useful for directing the mobile device 118a-d data collection operations.

Figure 3B:
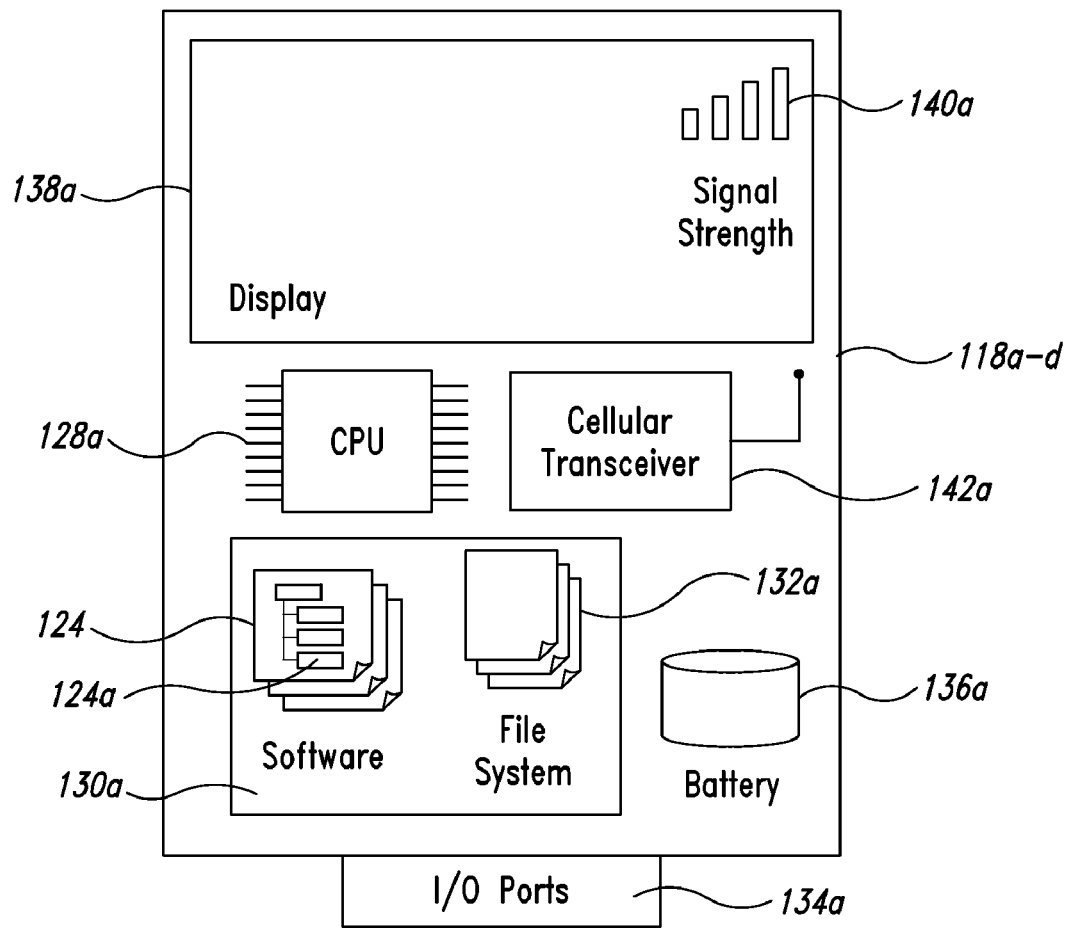
FIG. 3B illustrates several components of mobile devices from FIG. 3A.

FIG. 3B illustrates several components that mobile devices 118a-d have in common. The mobile devices 118a-d are electronic communications devices having a central processing unit 128a and a volatile and/or non-volatile memory 130a. The memory 130 a stores instructions and data acted on by CPU 128a.

Memory 130a comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like.

Inside memory 130a, a particular collection of software instructions 124 are executed by CPU 128a in order to collect performance characteristics of the mobile device 118a-d, e.g., network data. The software instructions 124 operatively configure hardware and other software in the mobile device 118a-d so that particular test conditions may be set up and particular measurements may be taken. The test conditions, the resulting measurements, and other data are stored in a file system 132a. File system 132a may be a traditional file system, one or more database systems, or any other method known in the art for storing such information, or any combination of the above, including implementation using distributed computing techniques.

The mobile devices 118a-d further have a collection of input/output ports 134a for passing data over short distances to and from the mobile device 118a-d. For example, serial ports, USB ports, WiFi ports, Bluetooth ports, IEEE 1394 FireWire, and the like can communicatively couple the mobile device 118a-d to other computing apparatuses.

Mobile devices have a battery 136a and a display 138a. In many mobile devices 118a-d, a signal strength indicator 140a is prominently positioned on the display 138a to provide network communication connectivity information to the mobile device 118a-d operator.

A cellular transceiver 142a is used to couple the mobile device 118a-d to other communication devices through the cellular communication network 122. In some cases, software 124 and data in file system 132a are communicated between the mobile device 118a-d and a server 120 via the cellular transceiver 142a. That is, bidirectional communication between a mobile device 118a-d and a server 120 is facilitated by the cellular transceiver 142a. For example, a server 120 may download a new or updated version of software 124 to the mobile device 118a-d over the cellular communication network 122. As another example, the mobile device 118a-d may communicate network performance measurement data stored in file system 132a to the server 120 over the cellular communication network 122.

Each mobile device 118a-d client has electronic memory 130a accessible by at least one central processing unit 128a within the device. The memory 130a is programmed with software 124 that directs the one or more central processing units 128a. Some of the software modules in the memory 130a control the operation of the device 118a-d with respect to collection of data. In some cases, software 124 directs the collection of individual datums, and in other cases, software 124 directs the collection of sets of predetermined cellular network, geographical, and device test measurements.

Software 124 may include a fully executable software program, a simple configuration data file 124a, a link to additional directions, or any combination of known software types. When the server 120 updates software 124, the update may be small or large. For example, in some cases, server 120 downloads a small configuration data file 124a to as part of software 124, and in other cases, server 120 completely replaces all of the present software 124 on the mobile device 118a-d with a fresh version. In some cases, software 124 is encrypted, encoded, and/or otherwise compressed for reasons that include security, privacy, data transfer speed, data cost, or the like.

A mobile device 118a-d executing software 124 addresses many shortcomings of the conventional methodology. Generally speaking, the conventional methodology uses an optimized antenna and transceiver system, which is not capable of collecting true, end-user experience data. In contrast, software 124 enables a specific mobile device 118a-d, provisioned for typical operation on a wireless communication network, which a user operates to access the wireless network, to collect location based true user quality data. The mobile device 118a-d is operable to access contracted wireless network services provided by the wireless cellular communication network 122.

More particularly, software 124 provides many advantageous features for the wireless network performance measurement system 110. The advantageous features are not found in the conventional methodology. For example, software 124 runs as a software application on a production-type mobile device 118a-d whereas the conventional methodology requires customized test equipment. Software 124 minimizes power consumption on the mobile device 118a-d while collecting information such as network parametric data, device location data, and user experience quality data, but the conventional methodology ignores power consumption. In addition, software 124 is directed by a centralized server 120, and software 124 sends data to a centralized server farm, but the conventional methodology has no such provision. The data sent by the mobile device 118a-d to the centralized server 120 can be used to evaluate, compare and improve the overall user experience on the wireless network that a user of device 118a-d operates for both voice and data communications.

In a preferred embodiment, software 124 collects information about the quality of the wireless communication network 122 that reflects actual user experience. The technique used in a mobile device 118a-d is to employ the actual hardware that a user operates when accessing the wireless network 122. The actual hardware includes the radio module, the audio module, the display module, and the other circuitry of the mobile device 118a-d.

One information datum collected includes network signal strength. Network signal strength is collected using the same network signal strength measurement that is presented to the user. This is useful because a user often monitors the network signal strength, e.g. through an icon. It is understood that the true network quality is not necessarily reflected correctly by the presentation to the user; however, the network signal strength presented to the user affects the user's impression of the network quality.

Network signal strength may have many components and representations. That is, network signal strength is particular to the mobile device 118a-d and the network 122 where the device is operating. For example, in some cases, network signal strength is a simple power measurement in milliwatts (mW) of the magnitude of the received signal's electric field, and in other cases, the power is measured as a ratio in decibels (dB) related to a one milliwatt reference signal (dBm). In still other cases, network signal strength refers to a signal to noise ratio, which is a relative determination between the strength of the desired radio information signal and the undesired noise interfering with it. Broadly understood, network signal strength is any measurement that characterizes the intensity and integrity of the wireless information signal received by the mobile device 118a-d.

Another information datum collected is data transmission speed. Data transmission speeds are generally collected using the highest level of application programming. This datum is useful because it takes into account even the degradation due to the mobile device hardware, software, and current operational environment. Data transmission speeds may include both voice or other data. Data transmission speed measurements may include both transmit and receive measurements, i.e., data transmitted by the mobile device 118a-d through the network 122 and data received by the mobile device 118a-d through the network 122. In some cases, the data transmission speeds are known as data download and data upload speeds.

Audio quality information is also collected. Audio quality is measured using the actual microphone and speaker of the mobile device 118a-d that the user uses to make and receive calls. In this way, information related to a user's true audio experience will be measured.

In the preferred embodiment of the new wireless network performance measurement system 110, several considerations are taken into account to minimize the impact of data collection on the user's actual experience of operating the mobile device. For example, power management, system responsiveness, audio path disruption, ease of installation, and background execution are all considered as described herein. If the functionality of any of these considerations is degraded by the data collection, then the user's experience is adversely affected significantly. The data collection software is selected to execute in a manner that will not affect the measurement of the system being measured. Several examples of this will now be given.

A first example is power consumption. Even though mobile devices 118a-d are capable of hard-wired, external power or conventional alternating current (AC) power connections, many devices are powered substantially by batteries. In some cases, the batteries are disposable, and in other cases, the batteries are rechargeable, but in either case, batteries are generally capable of operating the device for only a short time before needing to be replaced or re-charged by the device operator. That is, after just a few hours, days, weeks, or some other short time period, the operator must attend to the expended batteries. Accordingly, maximizing the battery life of a mobile device 118a-d is often a goal of device manufactures, device sellers, and device users.

The mobile device 118a-d uses power during data collection. That is, the execution of software and the operation of hardware solely for the purpose of collecting, processing, and distributing test data will expend power that would not otherwise be expended. If wireless network performance measurement system 110 minimizes its power usage, then the attention to the battery required by the device 118a-d is minimized. The additional power consumed by the testing can be considered and taken into account when measuring power consumption in one embodiment. The power consumed by the testing software 124 will not be considered a power consumed by the system in such an embodiment. In other embodiments, the battery life will be reported based on the life as it would have been without the test software 124 running at various times.

In a preferred embodiment of software 124, data is collected only in certain locations and as infrequently as possible to minimize overall power consumption of the mobile device 118a-d. By reducing the data collection locations and frequency, power usage is reduced and correspondingly, the user's perception that software 124 is detrimentally affecting the power usage of the mobile device 118a-d is reduced.

A second example is internal CPU usage. The test software 124 makes use of the CPU, so that when it is executing, the CPU usage goes higher. The software 124 monitors how much its own use is adding to the CPU usage factor and subtracts this from the measurement, according to one embodiment.

A third example is bus throughput on internal bus data transmission speed. To the extent running the tests affects the internal bus throughput, this is accounted for and removed from the test results.

A fourth example is interrupt measurements, which, since the CPU receives interrupts as part of its standard operations and also when being tested by software 124, these test based interrupts should not be counted in the system performance. More or less of these accommodations of the measurement affecting the measured quantity can be considered and taken into account by the software 124 according to various embodiments.

In order to collect data only in certain locations, one embodiment of software 124 records and updates the name and/or ID of the currently connected (i.e., associated) cell tower. In many devices, the radio module independently communicates with one or more cell towers. A cell tower that has established connection with a device supplies its name and/or ID to the device, and the name and/or ID is stored in the radio module. The data exchange that transfers the cell tower name to the mobile device 118a-d is a transaction that is executed independently on the device. The transaction is even executed when the mobile device 118a-d is in a power saving mode.

The wireless network performance measurement system 110 uses the cell tower name to break down data collection coverage areas into sectors. Server 120 maps out these sectors to determine which sectors should be updated with fresh data. Based on the sector mapping, or based on the least recently updated sector, or based on some other means, server 120 will send a particular cell tower update list to the mobile device 118a-d. The cell tower update list includes cell tower names identifying sectors where server 120 requests updated wireless network performance data. When the mobile device 118a-d detects that it is connected to a cell tower on the list, the mobile device 118a-d will collect data whenever the device moves more than some predetermined amount, for example 30 meters.

In another preferred embodiment, a unique user location profile may be generated for a mobile device 118a-d operating in a wireless network performance measurement system 110. For example, each mobile device identified by server 120 may be given a unique identifier. The unique identifier may be random number, an Electronic Serial Number (ESN), an International Mobile Equipment Identifier (IMEI), or some other number. In many cases, the number is encrypted. After generating the unique identifier, the identifier may be combined with typical geographic and time information to create the unique user location profile for each mobile device 118a-d.

After a user location profile is generated for a mobile device 118a-d, the profile is available for use by server 120 to collect particular data at particular times and in particular locations. In some cases, server 120 can use the profile in a predictive manner, and in other cases, server 120 can use the profile to make decisions about data retrieval from particular mobile devices 118a-d. The server 120 sends new software 124 (e.g., a configuration data file 124a) to the mobile devices 118a-d in order to change the testing being performed. It also sends instructions and queries to the software 124 to cause it to execute selected routines as directed by the server 120 or for the server to understand what version of the software 124 is present on each of the devices 118a-d, what tests each is conducting at any given time, and to learn other things about the respective devices 118a-d.

In order to collect data only in certain locations and as infrequently as possible, server 120 actively monitors how many mobile devices 118a-d are currently in a particular sector. Server 120 further monitors which sectors have outdated or otherwise insufficient data. Server 120 may increase or decrease the frequency of data collection of a mobile device 118a-d based on the age, quality, or volume of data previously gathered. Software 124 in a mobile device 118a-d is responsive to the requests for data of server 120.

When the wireless network performance measurement system 110 is initialized in a new geographical area, the number of data collection mobile devices 118a-d may be small. Performance and power considerations are considered for each mobile device 118a-d, so server 120 may only request data in certain areas of interest, and server 120 may function to prevent or minimize the collection of data in overlapping areas. For example, in areas where there are few mobile device clients 118a-d, the mobile device client may be requested to collect data with greater frequency only in areas where server 120 does not currently have data. Alternatively, server 120 may reduce or suspend requests for data in areas where server 120 does not currently have data. In other cases, server 120 may request data based on one set of parameters, but software 124 of mobile device 118a-d may decide locally whether and how to respond to the request based on a local set of parameters. Parameters that software 124 may use to decide whether and how to respond include current battery life, current processor utilization, scheduled events, and the like.

In some cases, the wireless network performance measurement system 110 is initialized or operating in a geographical area where the number of data collection mobile devices 118a-d is large, e.g., 5000 or more devices. In such cases, server 120 may further function to adjust the frequency and/or volume of data collection by a particular mobile device 118a-d. For example, rather than collecting data from every device, server 120 may collect data from only some devices and use techniques such as statistical modeling, to create a complete set of wireless network performance data. As another example, server 120 may direct some mobile devices 118a-d to collect data of one type and direct other mobile devices 118a-d to collect data of another type. The wide range of data collection directions provided by server 120 in a geographical area having many mobile devices 118a-d reduces the demand for power due to data collection on each mobile device 118a-d.

Another technique used by the server 120 to direct data collection only in certain locations and as infrequently as possible is to take advantage of location based services on the mobile device, for example, the global positioning systems (GPS) within some mobile devices 118a-d. The GPS is capable of providing latitude and longitude coordinates as well as other distance and positional information. Operating the GPS circuitry, however, uses a large amount of power on most devices. Accordingly, it is often desired to collect GPS data only when mobile device 118a-d has changed location.

One technique used to minimize the frequency of GPS driven data collection is to take advantage of the cellular network's capability to provide the distance of the mobile device 118a-d from the closest cellular tower or any other cellular tower. The cellular tower information is collected by the radio hardware in the mobile device 118a-d, so a request from software 124 to the radio hardware for this information will generally not increase power consumption. More particularly, each radio module on the mobile device 118a-d monitors the distance between the device and the currently connected cell tower. This distance data is independently updated by the radio module on the mobile device 118a-d even in a power saving mode. By monitoring the value of this distance, software 124 can detect when the mobile device 118a-d is in motion and when the mobile device 118a-d has moved from a particular position by a predetermined amount, e.g., 30 meters.

Using the distance information from the cellular tower, a set of data collection rules provided by server 120 or otherwise available to software 124 direct whether or not the GPS module needs to be engaged. For example, if the distance to the closest cellular tower has not appreciably changed, then the mobile device 118a-d may not be directed to capture new GPS coordinates and new network performance data.

Another data set collected by the wireless network performance measurement system 110 is the speed of data transmission across the wireless network 122 and within the mobile device 118a-d. The collection of data speed measurements, however, consumes power. Data speed measurements involve sending and receiving network data using the mobile device's 118a-d wireless radio transmission and reception circuitry.

There are several techniques used to reduce the power consumption of the data speed measurement test. For example, in one technique, mobile device 118a-d is only directed to collect data when the device is at a specific location. In a second technique, data speed measurements are performed infrequently on any given device, but the data speed measurements are performed on many devices so that a wide range of data is gathered. In a third technique, data speed measurements are collected by evaluating user or network directed data transmissions instead of sending and receiving dedicated test data for the data speed measurement. In a fourth technique, dedicated test data is piggybacked on a preexisting data transmission. In many cases, power consumption for data speed measurement is reduced because the radio is already being operated for another purpose, e.g., when a user is checking email, surfing the web, transferring files, or some other user requested purpose.

Data collected by the mobile device 118a-d is returned to server 120. Another technique useful to saving power on the mobile device 118a-d is to adjust the manner in which the data is returned to server 120.

Many devices, such as mobile device 118a-d, contain a large amount of file storage space. This storage space is useful to software 124 for storing wireless network performance data. In one embodiment, the software 124 is designed to send GPS and other test information to the server 120 only when it is plugged into a power supply. With file storage capability, software 124 can wait to send the data to the server 120 until the mobile device 118a-d is being charged or is otherwise operating from a power source more robust than a battery, such as an external source. Alternatively, in cases where it is not reasonable to wait until the device is being charged, software 124 can piggyback the performance data on user initiated data transfers. The piggy-backing technique minimizes the need to establish a new connection, which can reduce power consumption.

In some embodiments, software 124 operates in a Microsoft Windows Mobile environment. In a Microsoft Windows Mobile environment, the mobile device 118a-d is often connected to a PC using an ACTIVESYNC protocol. The ACTIVESYNC protocol is one of many similar configuration and networking protocols that use a wireless or wired network resource to transmit and receive data. In such cases, the mobile device 118a-d is charging, however the cellular radio functionality is temporarily disabled. In these environments, the technique of piggy-backing data on user-initiated data transmissions is useful to reduce power consumption on the mobile device 118a-d.

In other embodiments, software 124 functions in another commercially available operating system environment. In these cases, software 124 may be ported to specifically function in the particular operating system or software 124 may be generic enough to operating on several operating systems. In these cases, different techniques may be used to save power, transfer information, or the like.

Another useful technique is to take further advantage of circumstances where mobile device 118a-d is being charged or is otherwise operating from a robust power source (e.g., an external power source). In these cases, software 124 may be directed to conduct additional or more data intensive testing. For example, in some cases, mobile device 118a-d is plugged into a vehicle's power source. If the vehicle, e.g., an automobile, is moving, then the mobile device 118a-d may perform an expanded range of wireless network performance data collection.

Data may also be collected in mobile devices 118a-d without GPS capability and where the device stays within range of a particular cellular tower name.

The operation of software 124 is preferably un-noticed by a user of the mobile device 118a-d. More particularly, the software 124 should not cause the user to notice an impact on the CPU performance and file system of the mobile device 118a-d. One way to avoid this is to schedule software 124 to run at a very low priority. Another way is to permit user requested actions to be performed without delay. For example, in addition to operating at a low priority, software 124 can be configured to immediately suspend operation when a user requested action is detected.

Audio quality data is collected by the wireless network performance measurement system 110. Preferably, the measurement of audio data quality will not be noticed by the user of the mobile device 118a-d. One technique useful for keeping software 124 from impacting, adversely and significantly, the user experience of the mobile device 118a-d is to collect data when the audio circuitry is used, but to suspend processing of the data until the audio circuitry is no longer being used. For example, data may be collected during a phone call or during audio playback of a particular file, but any post-processing of the data occurs at a later time, and the results collected are transmitted to server 120 at a later time.

In a preferred embodiment, software 124 is easy to install and the installation procedure will have little or no user intervention. For example, the installation of software 124 may be composed of a simple over-the-air (OTA) download having a click install, no questions presented to the user, and not requiring the user to reboot the device. In this manner, the user will be aware that software 124 has been installed, but the installation procedure will have been relatively quick and easy.

Also in a preferred embodiment, software 124 will run generally in the background, transparent to the user. Preferably, the user will be aware that software 124 is performing data collection work on the mobile device 118a-d, but the actual operation of software 124 will be un-noticed. In this manner, a user may be encouraged to install software 124 and permit the mobile device 118a-d to collect data for the wireless network performance measurement system 110.

The wireless network performance measurement system 110 presents a structured device management architecture in which to operate software 124. The structured architecture permits an external device, server 120 for example, to direct the operation of mobile device 118a-d. The structured architecture further permits the data collection of mobile device 118a-d to be synchronized with other mobile devices.

For example, synchronization of data collection permits multiple mobile devices to be directed with either the same or complementary data collection techniques. In this manner, the effectiveness of each mobile device within the wireless network performance measurement system 110 may be increased. For example, in some cases, the real time location of the device is used to determine which data will be collected. In other cases, different criteria are used to direct the data collection including the type of device, the current application load, the signal strength indication, or the like.

Within the wireless network performance measurement system 110, a mobile device 118a-d can be associated with one or more particular groups on the server 120. The grouping permits a server 120 to configure multiple mobile devices 118a-d with a common set of data collection rules such as a data collection update schedule. Generally, the mobile device 118a-d is unaware of which group it is currently associated with, but in some cases, during system testing for example, the mobile device 118a-d is aware of its group assignment.

Mobile device 118a-d is operable to accept direction from server 120 when server 120 communicates with the mobile device 118a-d. In one embodiment, communication between the server 120 and the mobile device 118a-d is facilitated through one or more data sockets. That is, mobile device 118a-d opens a data socket to server 120, which permits direction from server 120 when the rules are to be changed, software is to be updated, or any other control information is to be exchanged. In cases where a single socket is opened, the communication of all control information over the single socket is helpful to reduce data network usage.

Server 120 is operable to update and modify the data collection rules for the mobile device 118*a-d*. For example, in some cases, server 120 configures the mobile device 118*a-d* with parameters including a list of data points to collect, a list of real-time locations identifying where data will be collected, and an indication of how often data points should be collected. Generally, server 120 configures the mobile device 118*a-d* asynchronously and at any time.

In a preferred embodiment, software 124 includes a configuration data file 124*a*. The configuration data file 124*a* is generally received from server 120 in a wireless manner, but other techniques may also be used. For example, a wired connection or a memory card may be used to provide the configuration data file 124*a* of software 124 of the mobile device 118*a-d*. Alternatively, the configuration data file 124*a* may not even reside on the mobile device, but instead be remotely located and merely accessible by the mobile device 118*a-d*.

The configuration data file 124*a* of software 124 may be small or large, but typically represents rules passed to the mobile device 118*a-d* that are to be followed by the device when collecting data. In some cases, the configuration data file 124*a* has executable code that carries out or otherwise directs the rules, but in other cases, the configuration data file 124*a* has only indicators of which pre-programmed rules that the mobile device 118*a-d* will follow.

Several data collection rules direct the data collection operations of the mobile device 118*a-d*. By operating the mobile device 118*a-d* under a set of changeable rules, the value of the data that is collected and passed to the server 120 is improved. For example, in some cases, the rules are directed to all mobile devices 118*a-d*, and in other cases, the rules are directed only to particular devices. Other preferred embodiments take advantage of the user location profile for the particular mobile device 118*a-d*. That is, based on the unique identifier for the mobile device 118*a-d*, the time, location, or other parameters of the device may be predictively and/or dynamically used to direct the data collection.

One rule passed to mobile device 118*a-d* is a cell tower list rule. The cell tower list rule includes a list of cell tower areas where data collection is desirable. According to this rule, software 124 monitors the identity of a currently connected cell tower, and when the mobile device 118*a-d* connects to a new cell tower, software 124 scans the cell tower list to determine if data collection has been directed. In some cases, the cell tower list is disabled, which is a direction to the mobile device 118*a-d* to collect data in all areas.

Two other rules passed to mobile device 118*a-d* are a data speed test frequency rule and a data latency test frequency rule. The rules include a value of how many seconds the mobile device 118*a-d* will wait between each data speed test or each data latency test respectively. Server 120 can direct mobile device 118*a-d* to run a data speed or data latency test at a single frequency, at a particular pattern of frequencies, a random frequency, or at some other interval. Further, individual cell towers or groups of cell towers in the cell tower list rule can correlate independent values for the data speed and data latency test frequency rules. In addition, when the cell tower list is disabled, independent default values may be specified for the data speed and data latency test frequency rules.

Through the data sockets, a particular command channel can be opened up from server 120 to mobile device 118*a-d*. The command channel may be initialized by either the server 120 or the mobile device 118*a-d*, and either unit may initiate a control cycle. The command channel permits the communication of control information between the server 120 and the mobile device 118*a-d*. Using the command channel between the server 120 and the mobile device 118*a-d*, the centralized server 120 can interrogate the software 124 for its current version. For example, server 120 may send a "VERSION" command to mobile device 118*a-d*. Software 124 will return its current version number to server 120. In one embodiment, the version number will be a single floating point number.

Using the command channel between the server 120 and the mobile device 118*a-d*, the centralized server 120 can update the software 124 of the mobile device 118*a-d* to latest version. Generally, after the software 124 has been updated, the new version of software 124 will restart without the need for a reboot of the mobile device 118*a-d*.

The command channel between the server 120 and the mobile device 118*a-d* can be used for many other commands. For example, an UPDATE command is useful for sending a name string from the server 120 to the mobile device 118*a-d*. A TIME_SYNC command is useful for synchronizing the current time, date, day or the like between the server 120 and the mobile device 118*a-d*.

The use of particular rules for data collection, along with the command channel for communicating command information, permits the mobile device 118*a-d* to collect significant data related to the wireless network performance measurement system 110. For example, Table 1 lists several data sets and individual data points that are collected by a mobile device 118*a-d* in a preferred embodiment.

TABLE 1

| Data collected and communicated to a server |
|---|
| Cellular Network Signal Strength |
| 802.11 Network Signal Strength |
| Network Capability level (Ex. 2G, 3GPP, LTE, etc.) |
| Network Technology (Ex. WiMAX, EDGE, etc.) |
| Data Transfer Speed, both Upload and Download |
| Data Transfer Latency from the device to the server and the gateway |
| Video Quality at different bitrates |
| Dropped Call/Network errors |
| Transition from one cellular network technology to another technology such as a transition from 3G to Edge. |
| Audio Quality both directions on different cellular network technologies such as 3G, Edge, etc. |
| Battery Life on different mobile phones and different cellular network technologies |
| Lost audio network packets that is experienced as choppy or poor audio |
| SMS/Text latency |
| Tower ID |
| Signal to Noise Ratio (SNR) |

In a preferred embodiment of a mobile device 118*a-d* that is running the inventive data collection operations described herein, a program in software 124 executes. In one embodiment, descriptively called the Service Mode, the software 124 is operating in the background, with no indication to the user of the mobile device 118*a-d* that the program is running. At other times, descriptively called the Application Mode, the background application is accessible to the user of the mobile device 118*a-d* to either provide information to the user or to operate according to instructions from the user. Embodiments of both the Service Mode background application and the Application Mode foreground application will now be described with reference to the figures.

For example, on a mobile device 118a-d, in software 124, a data collection client software program is initialized and begins execution in the Service Mode. The program requests particular resources from the operating system that is executing on the mobile device 118a-d, and the program sets up particular data structures in software 124 and file system 132, both of which are resident in memory 130 in the preferred embodiment.

In the Service Mode, the program typically has two main functions. A first function of the Service Mode operates to collect data from the mobile device 118a-d. A second function of the Service Mode operates to communicate the collected data to a central collection server.

In the Service Mode, the user does not have to dynamically interact with the software 124 to provoke the application to collect the required data. For example, a predefined set of rules may be present in software 124, or alternatively, a default configuration data file 124a is resident within software 124. The predefined rules or configuration data file direct the operations of the Service Mode. In other cases, if the default configuration is not present or is outdated, a new configuration data file 124a may be loaded into software 124 or file system 132a. Advantageously, a configuration data file 124a permits quick and dynamic control of the Service Mode without substantial changes to software 124.

In one embodiment, the Service Mode operations will request a new configuration data file 124a from a server 120. In other embodiments, a server 120 will initiate a download of a new configuration data file 124a to the mobile device 118a-d. The communication of the configuration data file 124a may be manually directed or may be scheduled for automatic operation. In any case, when a new configuration data file 124a is downloaded wirelessly, server 120 and the mobile device 118a-d form an HTP, UDP, FTP, or other connection to facilitate the download.

In one embodiment, the configuration data file 124a is very small. In such an embodiment, the configuration file 124a is received as a payload of a single message packet from the server 120. Accordingly, the small configuration file 124a serves many purposes. For example, in environments where the data communication services are not robust, a small data payload increases the likelihood of communication success. As another example, the small configuration data file 124a reduces the power consumed by the mobile device 118a-d.

In the preferred embodiment, the collection function of the Service Mode gathers a set of Key Performance Indicators (KPI), such as those found in Table 1. The mobile device 118a-d is scanned, and one, some, or a full set of all KPI are periodically collected and stored in memory 130a. For example, using an internal timing mechanism of the mobile device 118a-d, the KPI data may, by default, be collected one time every hour, one time every day, or by some other period.

In a preferred embodiment, the KPI data may be collected at the same time every hour or may be scheduled in another fashion. For example, the Service Mode may be configured to scan the mobile device 118a-d at the same time each hour within a 24-hour period, and then, at the beginning of the next 24-hour period, the minute within each hour when the KPI are collected is offset by a predetermined amount. In this manner, for example, if the predetermined amount of offset is one minute, then after a 60-day cycle, the mobile device 118a-d will have been scanned at every minute at least once throughout a 24-hour time span.

As another example, the KPI data may be collected at any time within a particular time window. That is, when the mobile device 118a-d is active, the current time may be retrieved, and if the current time is within a particular time window, then the mobile device 118a-d is scanned.

After KPI data is collected, the data is communicated in an update function of the Service Mode to server 120. The data may be requested by the server 120 or the communication of KPI data may be initiated by the mobile device 118a-d. For example, using an internal timing mechanism of the mobile device 118a-d, which may be the same or a different timing mechanism used during KPI data collection, the collected data may be communicated to the server 120.

In some cases, the Service Mode may have timers set to trigger a KPI data collection scan of the mobile device 118a-d at a time which overlaps another trigger set to send KPI data to a server 120. Advantageously, the KPI data collection scan is most often allowed to complete before the data is updated to server 120. In this way, the updated KPI data communicated to server 120 is the most recent data collected on the mobile device 118a-d.

As previously described, a configuration data file 124a in memory 130a directs the Service Mode to perform particular KPI data collection operations. The configuration data file 124a may be updated as needed to change which KPI data are collected, how often the KPI data is collected, the geographic location of where KPI data are collected, or any combination of these or other parameters.

For example, if it is determined that a particular geographic area in which a mobile device 118a-d operates has sufficient data that was collected during the morning, and a need for additional data during the evening, then an updated configuration data file 124a may direct the Service Mode to collect KPI data more frequently and only during the evening.

Other factors may also be used to update a configuration file 124a or to control operations of the Service Mode. For example, since mobile devices are generally sensitive to power consumption, the type of supply that is powering the mobile device 118a-d may also be considered. In one embodiment, a mobile device 118a-d that is plugged into a geographically fixed power supply, such as a cradle, will collect all KPI data available on mobile device 118a-d at a particular rate instead of just collecting the KPI data directed in a configuration data file 124a at a different rate. Similarly, if the mobile device 118a-d is plugged into a mobile power supply, such as a car charger, the Service Mode will operate to collect all KPI data more frequently or at a schedule impacted by geographic location. These and other modes are contemplated and easily directed by server 120 or by the programmed operation of the Service Mode.

Storage of the KPI is typically maintained until the KPI are off-loaded to server 120 or another server. In addition, or alternatively, the KPI may also be stored in a cyclical buffer arrangement wherein older data is released so that newer data may be collected.

Communication of the KPI data, the configuration data file 124a, or any other communications between the mobile device 118a-d and server 120 are optionally encrypted. By using an available encryption scheme, for example the exchange of secure keys in a symmetrical, asymmetrical, or other fashion, the information passed between the mobile device 118a-d and the server are kept confidential. In a preferred embodiment the validation of the information operates to prevent fraudulent and/or malicious information from infecting the mobile device 118a-d and/or the server 120. In addition, the validation of the information may also be used to govern the amount of KPI data received by the server 120.

E.g., legitimate data from a mobile device 118a-d may be intentionally rejected if the server 120 determines that the data is not necessary.

Figure 3C:
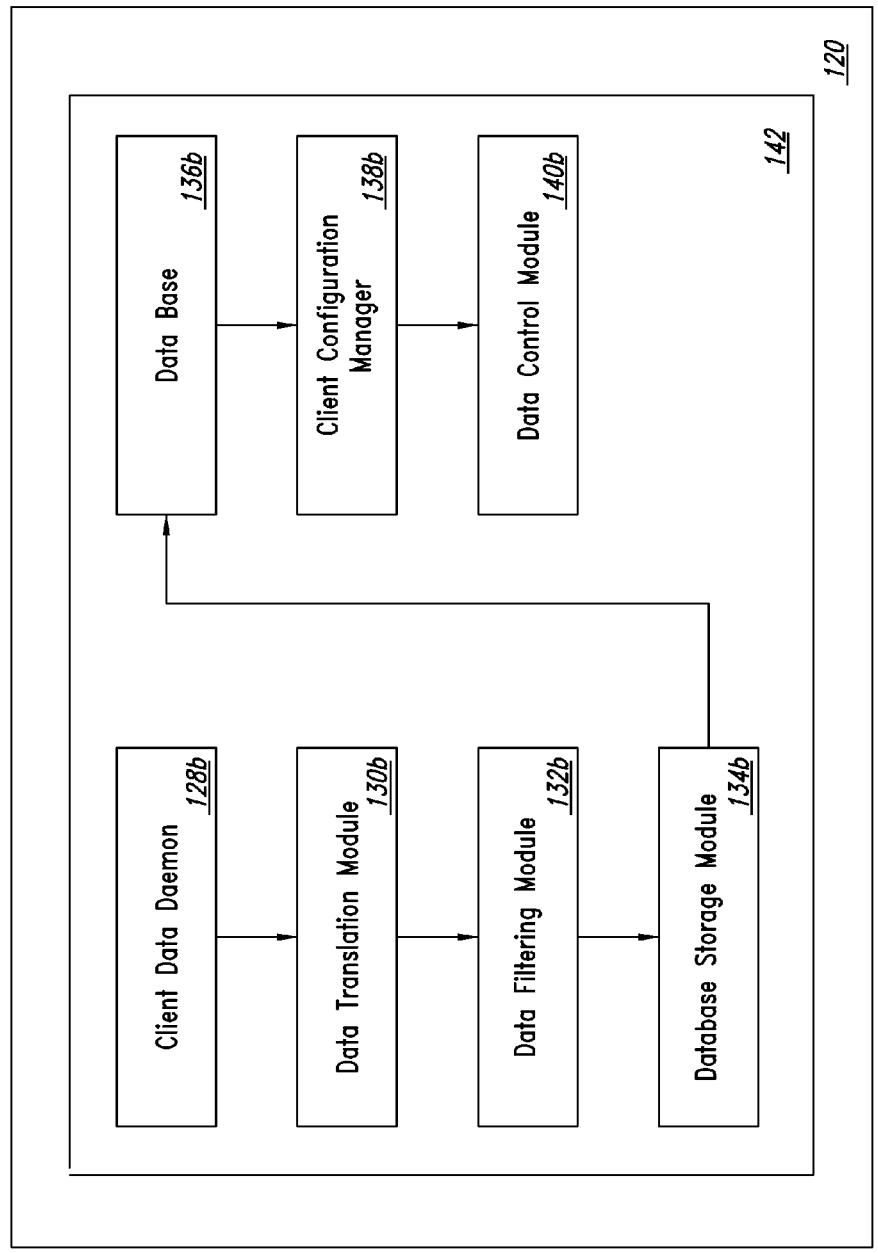
FIG. 3C illustrates portions of a non-limiting embodiment of a server 120 of FIG. 2.

FIG. 3C illustrates portions of a non-limiting embodiment of a server 120 of FIG. 2. Server 120 is a computing server that includes operative hardware found in a conventional computing server apparatus such as one or more central processing units (CPU's), volatile and non-volatile memory, serial and parallel input/output (I/O) circuitry compliant with various standards and protocols, wired and/or wireless networking circuitry (e.g., a communications transceiver).

As known by one skilled in the art, the a server 120 has one or more memories 142, each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

Server 120 further includes operative software found in a conventional computing server such as an operating system, software drivers to direct operations through the I/O circuitry, networking circuitry, and other peripheral component circuitry. In addition, server 120 includes operative application software such as network software for communicating with other computing devices, database software for building and maintaining databases, and task management software for distributing the communication and/or operational workload amongst various CPU's. In some cases, server 120 is a single hardware machine having the hardware and software listed herein, and in other cases, server 120 is a networked collection of hardware and software machines working together in a server farm to execute the functions of the wireless network performance measurement system 110. The conventional hardware and software of server 120 is not shown in FIG. 3C for simplicity.

FIG. 3C illustrates software components loaded into the memory 142 of server 120. The memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like.

A client data daemon 128b, a data translation module 130b, a data filtering module 132b and a database storage module 134b are programmatic applications that operatively work together to analyze and process data recorded in the wireless network performance measurement system 110. A database 136b is used to store raw and processed data.

Database 136b may be a traditional database, one or more database systems, a file system, or any other method known in the art for storing such information, or any combination of the above, including implementation using distributed computing techniques.

A client configuration manager 138b configures software running on one or more mobile devices 118a-d within the wireless network performance measurement system 110. For example, the software running a mobile device, 118a-d is a wireless network user quality data collection software program. A data control module 140b processes raw data from the mobile devices 118a-d and distributes the raw data to the programmatic applications.

In a preferred embodiment, server 120 sends data to and receives data from a large number of mobile devices 118a-d. Server 120 processes and stores location based mobile device user experience data received from the mobile devices 118a-d. After storage of the processed user experience data, the wireless network user quality data measurements (e.g., the data) are made available to additional servers, for example web server 126 (FIG. 2), for presentation to consumers. In such an embodiment, the remote computing device (e.g., web server 126) makes requests for particular data. The server 120 responds to the requests by providing or otherwise permitting access to the data.

In another preferred embodiment, a unique user location profile may be generated for one or more mobile devices 118a-d operating in a wireless network performance measurement system 110. For example, each mobile device identified by server 120 may be given a unique identifier. The unique identifier may be random number, an Electronic Serial Number (ESN), an International Mobile Equipment Identifier (IMEI), or some other number. In many cases, the number is encrypted. After generating the unique identifier, the identifier may be combined with typical, repeated geographic and time information to create the unique user location profile.

After a user location profile is generated for a mobile device 118a-d, the profile is available for use by server 120 to collect particular data at particular times and in particular locations. In some cases, server 120 can use the profile in a predictive manner, and in other cases, server 120 can use the profile to make decisions about data retrieval from particular mobile devices 118a-d.

For example, in order to collect data only in certain locations and as infrequently as possible, server 120 may actively monitor how many mobile devices 118a-d are currently in, or predicted to be, in a particular geographic area or sector during a particular time window. Server 120 may further monitor which sectors have outdated or otherwise insufficient data. Server 120 may increase or decrease the frequency of data collection of a mobile device 118a-d (e.g., using a user location profile) based on the age, quality, or volume of data previously gathered. Software in the mobile device 118a-d is responsive to the requests for data of server 120.

In another example, when the wireless network performance measurement system 110 is initialized in a new geographical area, the number of data collection mobile devices 118a-d may be small. In such circumstances, the server may collect large amounts of data from each mobile device 118a-d in the entire area. Performance and power considerations are considered for each mobile device 118a-d, so server 120 may only request data in certain areas of interest, and server 120 may function to prevent or minimize the collection of data in overlapping areas. That is, in areas where there are few mobile device clients 118a-d, the mobile device client may be requested to collect data with greater frequency only in areas where server 120 does not currently have data.

Alternatively, server 120 may reduce or suspend requests for data in areas where server 120 does not currently have data. In other cases, server 120 may request data based on one set of parameters, but software of mobile device 118a-d may decide locally whether and how to respond to the request based on a local set of parameters. For example parameters that the mobile device 118a-d may use to decide whether and how to respond include current battery life, current processor utilization, scheduled events, and the like.

The software in the server 120 may also modify its request for data based on the results of the data.

As examples, if the returned data shows that particular ones of the mobile devices 118*a-d* are nearly always plugged in to a separate power and supply and not usually batter powered, the server may send signals to more frequently use these mobile devices 118 for high power system checks, such as GPS sensing, antenna power consumption, or the like. Similarly, if the server sees that some of the mobile devices 118 are rarely used and have a wide available bandwidth in the CPU and also for transmitting and receiving, it may request additional tests or more immediate responses from such mobile devices 118. Alternatively, if the test results indicate rapid battery depletion, then the server can modify the commands it sends to reduce the battery usage and conduct fewer tests or only low power tests.

In some cases, the wireless network performance measurement system 110 is initialized or operating in a geographical area where the number of data collection mobile devices 118*a-d* is large, e.g., 5000 or more devices. In such cases, server 120 may further function to adjust the frequency and/or volume of data collection by a particular mobile device 118*a-d*. For example, rather than collecting data from every device, server 120 may collect data from only some devices and use techniques such as statistical modeling, to create a complete set of wireless network performance data. As another example, server 120 may direct some mobile devices 118*a-d* to collect data of one type and direct other mobile devices 118*a-d* to collect data of another type. The wide range of data collection directions provided by server 120 in a geographical area having many mobile devices 118*a-d* reduces the demand for power due to data collection on each mobile device 118*a-d*.

Another technique that may be used by server 120 to direct data collection only in certain locations and as infrequently as possible is to take advantage of location based services on the mobile device 118*a-d*. For example, a global positioning system (GPS) is available on some mobile devices 118*a-d*. Operating the GPS circuitry, however, uses a large amount of power on most devices. Accordingly, it is desired to collect GPS data only when mobile device 118*a-d* has changed location by a large distance or is plugged in. For example, the server 120 can send a software command to update the GPS location only after the mobile device 118 has been plugged into a power supply for a sufficient time to charge the battery.

One technique used to minimize the frequency of GPS driven data collection is to take advantage of the cellular network's capability to provide the distance of the mobile device 118*a-d* from the closest cellular tower or any other cellular tower. The cellular tower information, e.g., the distance, is collected by the radio hardware in the mobile device 118*a-d*. This distance data is independently updated by the radio module on the mobile device 118*a-d* even in a power saving mode. By monitoring the distance, the mobile device 118*a-d* can determine when it has moved from a particular position by a predetermined amount, e.g., 30 meters.

Using the distance information from the cellular tower, server 120 can direct whether or not the GPS module of the mobile device 118*a-d* needs to be engaged. For example, if the distance to the closest cellular tower has not appreciably changed, then the mobile device 118*a-d* may not be directed to capture new GPS coordinates and new network performance data.

The Client Data Daemon 128*b* (CDD) of server 120 is the subcomponent responsible for communicating with mobile devices 118*a-d*. A low level proprietary protocol is used to facilitate communication between the CDD 128*b* and each mobile device 118*a-d* via a communications transceiver. The protocol consists of a predetermined set of commands and responses. The commands and the responses are generally asynchronous packetized messages that are communicated between the server 120 and the mobile devices 118*a-d*.

In some embodiments, the server 120, via the CDD 128*b*, communicates configuration data to the mobile devices 118*a-d* as the payload of a single packet. Accordingly, the small configuration data serves many purposes. For example, in environments where the data communication services are not robust, a small data payload increases the likelihood of communication success. As another example, the small configuration data reduces the power consumed by the mobile devices 118*a-d*.

In some embodiments, the commands are grouped together and communicated between the CCD 128*b* and the mobile device 118*a-d* as a particular configuration file. The configuration file may be small or large, but typically represents rules, or configuration data points, passed to the mobile device 118*a-d* that are to be followed by the device when collecting data. In some cases, the configuration file has executable code that carries out or otherwise directs the rules, but in other cases, the configuration file has only indicators of which pre-programmed commands that the mobile device 118*a-d* will follow.

Within server 120, the proprietary protocol commands and responses between the server 120 and the mobile devices 118*a-d* are communicated through the client data daemon 128*b*. A retry mechanism of the CDD 128*b* operates to provide robust communication of messages between the server 120 and the mobile devices 118*a-d*. For each transmitted and/or received message that requires a response, the CDD 128*b* tracks whether such response was received and/or transmitted respectively. CDD 128*b* further tracks messages that are transmitted and/or received that do not require a response. Additionally, the CCD 128*b* functions as a load balancer between servers 120 so that a large server farm can be created to handle a large number of mobile devices 118*a-d*.

When data messages are received from a mobile device 118*a-d*, CDD 128*b* validates, buffers, parses, and partitions the data into predetermined data points. For example, when a mobile client device 118*a-d* transmits a stream of collected test data, the CDD 128*b* will confirm that the stream is valid using a technique such as a CRC check. The CDD 128*b* will further create a set of pointers into the data stream that identify particular items of the data such as signal strength, location, connected cell tower, distance from the cell tower, and other data. And the CDD 128*b* will partition the data into blocks for the Data Translation Module 130*b*.

Communication of the data messages, any configuration data (e.g., a configuration file), or any other communications between the mobile device 118*a-d* and server 120 are optionally encrypted. Available encryption schemes such as the exchange of secure keys in a symmetrical, asymmetrical, or some other fashion, may all be used. By using an encryption scheme, the information passed between the mobile device 118*a-d* and server 120 are kept confidential.

In a preferred embodiment the validation of the information operates to prevent fraudulent and/or malicious information from infecting the mobile device 118*a-d* and/or the server 120. In addition, the validation of the information may also be used to govern the amount of user quality data measurements received by the server 120. E.g., legitimate data from a mobile device may be rejected if the server determines that the data is not necessary.

The Data Translation Module 130 (DTM) is a subcomponent of server 120. DTM 130*b* is responsible for buffering and converting separate user quality data points from each mobile device 118a-d into a database column name. The DTM 130b provides a mechanism that permits a system administrator operating server 120 to change the database 136b structure without a need to make corresponding changes on the mobile devices 118a-d.

Within database 136b, one or more of the data points on the mobile device 118a-d have a corresponding column name. In some embodiments, all of the data points have a corresponding column name in the database. DTM 130b performs the translation of data points to column names via a lookup table, a user inquiry, an analysis of a unique identifier of the mobile device 118a-d, or by some other means.

DTM 130 further provides a buffering function for server 120. That is, in some circumstances, a large amount of data is asynchronously received from one or more mobile devices 118a-d. In such cases, DTM 130b temporarily stores some or all of the data until it can be further processed by other components of server 120.

After data received from a mobile device 118a-d has been passed through the DTM 130b, the data is analyzed by a data filtering module 132b (DFM). The DFM 132b is a subcomponent of server 120 that is operable to remove one or more invalid or uninteresting data points before the data is stored in database 136b.

Invalid or uninteresting data points occur in situations where a mobile device 118a-d may have streamed only a partial set of data or where the mobile device 118a-d has streamed an entire set of data, but some data fields in the set are not loaded with useful data. Data that is invalid, uninteresting, or otherwise not useful includes empty data points, data points from locations that are not interesting to the system, data points that are cumulative, and the like.

As described herein with respect to the mobile devices 118a-d, they may be in the middle of sending data and the user may request use of the same resources, such as by making a phone call.

The mobile device 118a-d would send a hold signal to the server 120 indicating that it has temporarily suspended operations for one or more reasons such as a low battery life, user commands, or the like.

In one embodiment, the server 120 will discard the partial data received and instruct the mobile device 118a-d that it has done so. The data can be resent or discarded, according to the needs of the server. For example, if there is a large amount of data already, the server may elect to discard it; alternatively, if there is a small amount of data already, the server may wish it to be resent from the beginning.

In a second embodiment in which transmission from the phone is interrupted, the server 120 will have the first part of the transmission and instruct the mobile device 118a-d that when it is available again to continue sending the data where it left off.

In some cases, the user location profile is used by the DFM 132b. For example, DFM 132b may use the user location profile to determine that an abundance of relevant, up-to-date data of a particular type is already stored in database 136b. In such circumstances, DFM 132b may ignore or actively remove some of the data from the mobile device 118a-d.

Further, in some embodiments, DFM 132b may even update the user location profile so that server 120 directs an associated mobile device 118a-d in its future data collection operations. For example, in one scenario, DFM 132b determines that sufficient data of a particular type and/or location from a mobile device 118a-d is already stored in database 136b. In another scenario, DFM 132b determines that database 136b contains insufficient data of a particular type. In these cases, DFM 132b may update the user location profile with representative information that server 120 later communicates to the associated mobile device 118a-d.

Upon detection by the DFM 132b of invalid or uninteresting data points, DFM 132b operates to remove the invalid or uninteresting data points from consideration by server 120. For example, DFM 132b may load identifiable indicators such as null pointers into the fields where data will not be extracted and saved. Alternatively, DFM 132b may set flags indicating that particular data fields are not to be saved.

After DFM 132b identifies data from a data stream that is to be stored in database 136b, a database storage module 134b (DSM) is activated. The DSM 134b is a subcomponent of server 120. DSM 134b is responsible for storing the filtered data points into database 136b.

Generally, DFM 132 inserts the preprocessed data into database 136b using a simple and fast insert command, for example a SQL command. Simple commands reduce the load on database 136b, which permits database 136b to support a large number of devices.

In a preferred embodiment, database 136b, a subcomponent of server 120, is a relational database accessible by Structured Query Language (SQL) commands. Database 136b maintains and stores the user quality test data received from mobile devices 118a-d, configuration data for mobile devices 118a-d, and other data related to the wireless network performance measurement system 110. In the preferred embodiment, DSM 134b builds SQL queries to store, retrieve, modify, and delete data in database 136b. DSM 134 further builds SQL queries to perform the administrative duties necessary to configure and manage database 136b.

Another subcomponent of server 120 is a client configuration manager 138b (CCM). The CCM 138b directs high level communications with mobile devices 118a-d to manage the configuration and the updating of a client software application loaded in mobile devices 118a-d. For example, CCM 138b communicates to mobile devices 118a-d commands that include directives to collect a predetermined set of user quality data points, directives of when to collect data, directives that identify a geographic region from which to collect data, and the like.

CCM 138 is coupled to database 136b, and CCM 138b has access to the organizational structure of database 136b. CCM 138b is operable to manage a large number of mobile device clients 118a-d by accessing the organizational structure of database 136b. That is, CCM 138 is operable to communicate directions to various groups of mobile devices 118a-d, individual mobile devices 118a-d, or even to every mobile device 118a-d that is part of the wireless network performance measurement system 110.

One function of the CCM 138b is to perform device management from a configuration and software version control perspective. The CCM 138b is able to instruct one or more devices, which may be divided into groups, to update the current mobile device 118a-d software to a specified version. In some cases, the CCM 138b allows server 120 to set up the configuration of each device individually, and in other cases, CCM 138b allows server 120 to configure a group of devices. The CCM 138b will also query a mobile device 118a-d or a group of devices for their status; such as battery strength, flash and memory space available, and other status variables.

In one embodiment, a mobile device 118a-d will initiate a request to be updated by server 120. For example, a mobile device 118a-d will request a new configuration file from server 120. In other embodiments, server 120 will initiate a download of configuration information, such as a new configuration file, to the mobile device 118a-d. The communication of the configuration file may be manually directed or may be scheduled for automatic operation. In such cases, when the new configuration file or other information is downloaded wirelessly, server 120 and the mobile device 118*a-d* form an HTP, UDP, FTP or other connection to facilitate the download.

In one embodiment, the configuration file is very small. In such an embodiment, the configuration file is transmit as a payload of a single message packet from the server 120. Accordingly, the small configuration file serves many purposes. For example, in environments where the data communication services are not robust, a small data payload increases the likelihood of communication success. As another example, the small configuration data file reduces the power consumed by the mobile device 118*a-d*.

The server 120 of the wireless network performance measurement system 110 presents a structured device management architecture to direct the operation of as few as one and as many as thousands of mobile devices 118*a-d*. The structured architecture further permits the data collection from many mobile devices 118*a-d* to be synchronized with other mobile devices.

For example, synchronized data collection permits multiple mobile devices 118*a-d* to be directed with either the same or complementary data collection techniques. In this manner, the effectiveness of each mobile device within the wireless network performance measurement system 110 may be increased. For example, in some cases, the real time location of the device (e.g., the user location profile) is used to determine which data will be collected. In other cases, different criteria are used to direct the data collection including the type of device, the current application load, the signal strength indication, or the like.

Within the wireless network performance measurement system 110, one or more mobile devices 118*a-d* can be associated with one or more particular groups by the CCM 138*b* of server 120. The grouping permits a server 120 to configure multiple mobile devices 118*a-d* with a common set of data collection rules such as a data collection update schedule.

In one example, a plurality of mobile devices 118*a-d* is grouped according to a geographic area where the plurality of mobile devices 118*a-d* is operating. The plurality of mobile devices 118*a-d* can be further grouped into subgroups, and the subgroups may be further divided into more narrow geographic areas, overlapping geographic areas, or the like. In this way, via multiple CCM 138*b* groupings, server 120 can communicate customized rules or configuration data to the one or more particular groups.

Generally, the mobile device 118*a-d* is unaware of which group it is currently associated with, but in some cases, during system testing for example, the mobile device 118*a-d* is aware of its group assignment. Instead, most often, each mobile device 118*a-d* merely takes direction from server 120 in the form of wireless commands. The wireless commands can direct the mobile devices 118*a-d* to perform wireless network user quality data collection operations at different times, at different locations, different frequencies, according to the cell tower the mobile devices 118*a-d* are associated with, or the like.

The server 120 is operable to provide direction to mobile devices 118*a-d* via wireless communication. In one embodiment, communication between the server 120 and the mobile device 118*a-d* is facilitated through one or more data sockets. That is, server 120 opens a data socket to a mobile device 118*a-d*, which permits the server 120 to direct the mobile device 118*a-d* when the rules are to be changed, software is to be updated, or any other control information is to be exchanged. In cases where a single socket is opened by the CDD 128, the communication of all control information over the single socket to a single mobile device 118*a-d* is helpful to efficiently use data network resources.

Server 120 is operable to update and modify the data collection rules for mobile devices 118*a-d*. In some cases, server 120 configures the mobile devices 118*a-d* with parameters including a list of data points to collect, a list of real-time locations identifying where data will be collected, and an indication of how often data points should be collected. Server 120 may configure each mobile device 118*a-d* asynchronously and at any time, or server 120 may configure groups of mobile devices 118*a-d* concurrently.

Several data collection rules determined within the CCM 138*b* direct the data collection operations on the mobile devices 118*a-d*. By directing the mobile devices 118*a-d* to operate under a set of changeable rules, the value of the data that is collected by the mobile devices 118*a-d* and communicated to the server 120 is improved.

One rule, or configuration datum, passed to mobile device 118*a-d* is a cell tower list rule. The cell tower list rule includes a list of cell tower areas communicated to the mobile device. The cell tower list informs the mobile device 118*a-d* data collection is desired by the server 120. According to this rule, the mobile device 118*a-d* is directed to monitor the identity of a currently connected cell tower and provide user quality data to server 120 if the connected tower is identified on the cell tower list. Subsequently, if the mobile device 118*a-d* connects to a new cell tower, the mobile device 118*a-d* is directed to re-scan the cell tower list and determine if data collection has been directed. In some cases, server 120 directs the mobile device 118*a-d* to disable the cell tower list, which is a direction to the mobile device 118*a-d* to collect data in all areas.

The cell tower rule may further take advantage of the user location profile generated for a mobile device 118*a-d*. For example, the known location of the cell tower may cooperatively be used with the present location of the mobile device 118*a-d* and the user location profile to collect particular data at particular times and in particular locations. Such information, when combined with a particular cell tower, provides an opportunity to collect very specific data related to the operation of the wireless network 122.

Two other rules communicated by server 120 to mobile devices 118*a-d* are a data speed test frequency rule and a data latency test frequency rule. The rules include a value of how many seconds the mobile device 118*a-d* will wait between each data speed test or each data latency test respectively. Server 120 can direct mobile device 118*a-d* to run a data speed or data latency test at a single frequency, at a particular pattern of frequencies, a random frequency, or at some other interval. Further, individual cell towers or groups of cell towers in the cell tower list rule (e.g., the user location profile) can correlate independent values for the data speed and data latency test frequency rules. In addition, when the cell tower list is disabled, independent default values may be specified for the data speed and data latency test frequency rules.

Through the data sockets, a particular command channel can be opened up from server 120 to a mobile device 118*a-d*. The command channel may be initialized by either the server 120 or the mobile device 118*a-d*, and either unit may initiate a control cycle. The command channel permits the communication of control information between the server 120 and the mobile device 118*a-d*.

Using the command channel between the server 120 and a mobile device 118*a-d*, server 120 can interrogate the mobile device 118*a-d* for the current client application software version. For example, server 120 may send a "VERSION" command to a mobile device 118*a-d*. The mobile device 118*a-d* will return the current client application software version number to server 120. In one embodiment, the version number will be a single floating point number.

Using the command channel between the server 120 and a mobile device 118*a-d*, server 120 can update the client application software of the mobile device 118*a-d* to different version. Generally, after the client application software of the mobile device 118*a-d* has been updated, the new version of client software will restart without the need to reboot the mobile device 118*a-d*.

When the server 120 updates the client application software of the mobile device 118*a-d*, the update may be small or large. For example, in some cases, server 120 downloads a small configuration file part of the client application software, and in other cases, server 120 completely replaces all of the present client application software on the mobile device 118*a-d* with a fresh version. In some cases, the client application software is encrypted, encoded, and/or otherwise compressed for reasons that include security, privacy, data transfer speed, data cost, or the like.

The command channel between the server 120 and the mobile device 118*a-d* can be used for many other commands. For example, an UPDATE command is useful for sending a name string from the server 120 to the mobile device 118*a-d*. A TIME_SYNC command is useful for synchronizing the current time, date, day or other chronological information between server 120 and one or more mobile devices 118*a-d*.

The use of particular rules for data collection, along with the command channel for communicating commands, permits the server 120 to direct a mobile device 118*a-d* to collect significant data related to the wireless network performance measurement system 110. For example, in a preferred embodiment, Table 1 lists several data sets and individual data points, which server 120 may direct a mobile device 118*a-d* to collect.

A non-limiting example of the operation of server 120 is now described. In the example, a particular set of rules (e.g., a configuration file) are defined by CCM 138*b* in order to direct a group of mobile devices 118*a-d*. The group information is retrieved by the CCM 138*b* via queries to database 136*b*. CCM 138*b*, after building the commands and data structures to direct the mobile device 118*a-d* group, communicates the directives to the group of mobile devices 118*a-d* via the CDD 128*b*.

When mobile devices 118*a-d* collect information as directed by server 120, the mobile devices 118*a-d* asynchronously pass the information to server 120 via CDD 128*b*. The data is collected through the DTM 130*b*, filtered by the DFM 132*b*, and stored in database 136*b* via DSM 134*b*. After the data has been stored in database 136*b*, DCM 140 analyzes and processes the data. DCM 140*b* further communicates a representation of some or all of the data to a web server for presentation to users.

Figure 4:
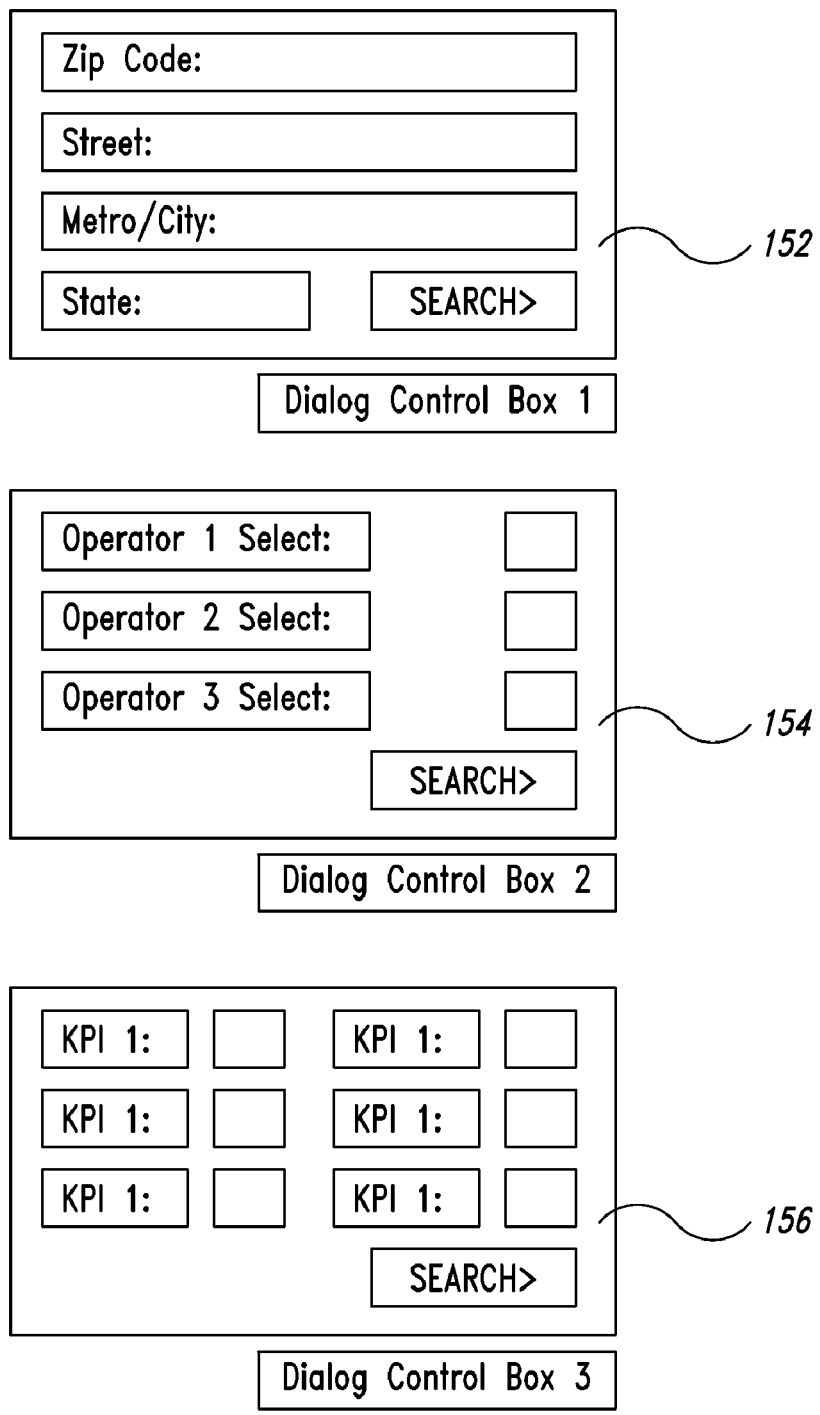
FIG. 4 illustrates one embodiment of dialog boxes presented on a website as described herein.

FIG. 4 illustrates one embodiment of dialog boxes presented on a website 150 as described herein. A first dialog box 152 permits a user to enter details of one or more particular geographic locations. A second dialog box 154 permits a user to enter one or more wireless cellular network provider indicators. A third dialog box 156 permits a user to identify a particular set of KPIs that represent data to be displayed on website 150.

In one embodiment, the user may be permitted to provide input to the server 120 for data to collect. Normally, the server 120 collects information from the mobile devices 118*a-d* on a master program. A viewer of the web portal data may wish to have additional or more detailed information in some areas of particular types. For example, a user may wish to have additional power supply information from one area or additional signal coverage information or a more complete list of dropped calls. In these instances, the web viewer will input to their computer a request to increase the collection rate of one or more KPI in an area. This request is input to server 120, which will follow the instructions and increase or decrease such data collection from the individual mobile device 118*a-d*. Of course, the request for more data from selected areas needs to be coordinated with the number of devices in that area and the needs of the mobile phone users in that area. If a web viewer inputs a request to increase a high power or data intensive KPI, such as GPS tracking or one using high CPU resources, the local mobile devices 118*a-d* may only partially comply in order to keep their users from being inconvenienced. The web user may be given a notification that his request is likely to be burdensome to the users and that only some of his request will be fulfilled.

After the geographic area, wireless cellular network carrier, and KPI information has been identified by a user, a representative map of the identified geographic area is brought to the foreground of website 150. Overlayed onto the geographic area, a set of coded grids representing a range of KPI averages for the particular area are displayed. For example, color coded grids representing signal strength.

In other embodiments, different KPI information, for example, cell tower identifiers (e.g., ID, name, type, etc.) is also displayed on a map. In such an embodiment, the screen data output may overlay one or more cell towers proximate to the particular geographic area or location. Further, the output may show an indication of network coverage of the cell towers derived from performance quality measurements of one or more mobile devices previously operated proximate to the identified geographic location.

Figure 5A:
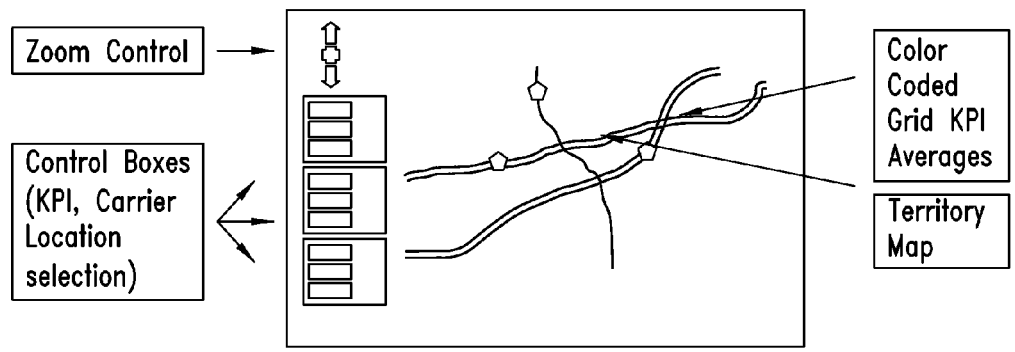
FIG. 5A illustrates an embodiment of a selected geographical map presented on the website.
Figure 5B:
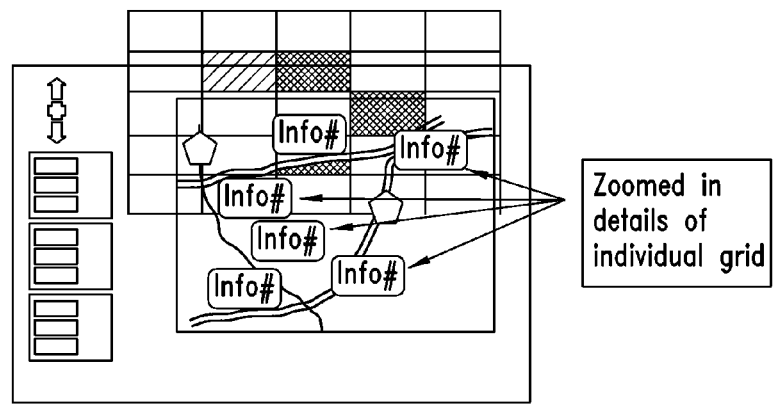
FIG. 5B represents a set of coded grids overlying the geographical map of FIG. 5A.

FIG. 5A illustrates an embodiment of a selected geographical map presented on the website 150. FIG. 5B represents a set of coded grids overlying the geographical map of FIG. 5A. The coded maps are shown as variously patterned grids in FIG. 5B for simplicity, however, it is understood that the grids may be colored, patterned, and/or otherwise separately identifiable in any like manner.

In a preferred embodiment, the maps and grids illustrated in FIG. 5A of website 150 are interactively controllable by a user. For example, as a user pans in and out of any particular area with a pan control embedded in software 142, surrounding grids would either be added to or subtracted from the KPI averaging calculations and presentation according to the user's operation of the pan control. As another example, a user could use a computer mouse to drag a displayed pointer over a grid where more granular details of a particular geographical area are desired. By selecting the particular grid, website 150 would display additional details about the particular KPI and/or the geographical location. In one embodiment, selecting the particular grid in order to request more information causes website 150 to present a tiled overlay pop up window having additional individual details that make up the KPI averaging color code for that specific grid area.

An embodiment of website 150 facilitates the comparison of wireless networking services offered by several network service providers. That is, KPIs of one network service provider may be conveniently compared against the same KPIs of one or more other network service providers. By comparing KPIs of several network service providers for the same geographic area, a user may learn which network service provider provides the most desirable level of service as measured by the KPI for the selected area.

In order to compare one network service provider against another network service provider for a given KPI, a toggle control on the website 150 may be used to switch between coded grids. That is, for easy and fast comparison, a user could use one or more mouse key clicks to alternately or concurrently display the coded grids.

In another example of comparing network service providers, wireless network performance software 142 may be functionally coded to automatically compare KPIs of one or more network service providers in a particular area. That is, a control dialog box may be presented that gives the user an opportunity to automatically find a "best supplier" for the selected KPI in the selected region. If the user operates the control box in order to cause the automatic operation, then software 142 would automatically mine a database of server 120. The results of the mining operation represent the "best supplier," and the results are presented on the website 150. The automatic functionality, which for example selects the best supplier for a given KPI with grid details for a given region, includes a Best Carrier Wizard as described herein.

Users of website 150 are provided with an opportunity to make comments on the service offered in a particular location by a particular carrier. In one embodiment, the user's comments are tagged to the particular KPI and map of a geographical area. Subsequently, other users may view the comments, and take an opportunity to provide additional comments.

In some cases, the users of website 150 are also users of mobile devices 118a-d that collect the data which populates website 150. In other cases, users of website 150 are researching KPI information for a particular location with a particular mobile device. In still other cases, the user is merely seeking information to help understand a particular user experience that the user has experienced. In cases where the user does not operate a data collecting mobile device 118a-d, website 150 offers the user an opportunity to operate their mobile device as a data collecting mobile device 118a-d.

More particularly, website 150 provides a portal for users to contribute KPI content. That is, the user may "sign up" to the website 150 and download the KPI client application to their mobile device. In some cases, website 150 provides one or more portals to download a client application targeted to operate on a particular type of mobile device. In some cases, website 150 further embodies incentive programs such as contests, merchandise earning credits, frequent contributor awards, and the like to encourage users of mobile devices to download the KPI data collecting client application onto their mobile device.

For example, one or more contest programs assign points to areas on website 150 such as particular geographic coverage maps. Under such an incentive program, geographic areas which typically have less mobile communication traffic and are thereby more difficult areas in which to collect KPI metrics, may accrue more points or may give more weight to accrued points than areas with heavy user mobile communication traffic.

When users collect KPI data from the geographical points of interest, the user's ID will be assigned points designated for the given area. Points are collected by users throughout the contest period. In some cases, a user having the most points collected at the end of the contest is given a reward stipend for winning the contest. In other cases, users receive different reward stipends proportional to the number or weight of the points they have collected. In still other cases, users collect points on an ongoing base. Once a user collects a given amount of points, the points can be redeemed for money, prizes, merchandise, or other incentive rewards.

The website may permit a user to customize the KPI's that are collected for his viewing from his own mobile device. In some embodiments, if the user of the mobile device is the one directing the KPI collection, the normal power roving and CPU consumption guards can be modified or dropped so that the user's phone may in fact have degraded performance or a shorter battery life because of the tests. But, because the user himself is deciding to perform the KPI collection, this may be permitted to a greater degree than would otherwise be allowed.

One or more "Select Best Carrier" (SBC) wizards are embodied in wireless network performance software 142 and presented on website 150. An SBC wizard allows a user to determine which wireless network carrier has the "best" KPI average for a particular facet of the network coverage, for a particular mobile device, and for a particular geographic area. In some cases, several KPI averages and/or several geographic regions may be averaged during the automatic selection of a "best" carrier. The "best" carrier may be the one with the strongest signal strength, greatest signal coverage area, fewest dropped calls, or some other calculable measurement.

In one embodiment, users of website 150 will operate a wizard by drawing one or more geographic boxes around particular areas of a geographical coverage map. In another embodiment, the user may select pin-points on a coverage map where the user intends to use a particular mobile device. Subsequently, after responding to one or more profiling questions such as ranking feature importance, the SBC wizard programmatically determines which network carrier will provide satisfactory service. In some cases, the SBC wizard ranks the particular offerings of several carriers and presents the results of the rankings to the user.

KPI Information supported on website 150 as described herein may also be collected from website 150 and reformatted to support other third party websites. For example, in one embodiment, another website that supports content complementary in nature to the content of website 150 would have the ability to serve some of the detailed KPI content of website 150 on the other website.

An additional, optional feature of website 150 is to provide a single, centralized website where users have access to a large amount of information related to wireless network coverage and mobile devices. The information content includes information proprietary to website 150, information shared amongst multiple sources, links to other information sources and the like. For example, the information content may include product reviews, best practices/white papers, newsletters, user feedback forums, webcasts, an online store, an alarms section, and the like.

A "Product Reviews" section of website 150 includes a wide range of information content ranging from an analysis of the details of specific mobile devices to comparisons of different types of cell-phone plans offered by one or more communication network carriers. The product reviews may also include details and user ratings of the customer service provided by the communication network carriers. In some cases, the information can broadly cover all geographic areas, and in other cases, the information can be representative of a particular geographic location.

A "Best Practices" section of website 150 includes information produced to help a user manage their mobile device platform more effectively. For example, some information may describe how to set up email. Other information may describe how to manage power usage. Still other information may describe how to address cellular service billing discrepancies and errors.

A "Newsletter" section of website 150 includes information supporting specific areas related to mobile communications. Users of website 150 may research or sign up to receive information related to particular areas of interest. For example, users may sign up to receive periodic information related to new releases of mobile operating systems. As another example, users may research information related to new mobile device product offerings from particular device manufacturers. As still another example, users may receive information related to particular network service providers or to the entire cellular wireless communication frequency regulations.

A "User Feedback/Forums" section of website 150 includes information and/or comments posted by other users of website 150. In some cases, the information and/or comments may be organized by topic, by date, or by some other means to answer questions or to provoke discussion. Users may also request help from other users of the forum to resolve a particular issue. In such cases, information and/or comments may be organized as particular topical threads having a series of comments and replies.

A "Webcasts" section of website 150 includes information related to particular mobile device usage or other areas of mobile communication. For example a collection of video clips include how particular mobile devices are set up right out of the box, how particular mobile devices are upgraded, configured with data collection software so as to operate as a data collection mobile device 118a-d, how particular devices are used for text messaging, and the like.

An "Online Store" section of website 150 includes direct to consumer sales of mobile devices, mobile device accessories, mobile communication service plans, and other goods and services. The online store may also include links to third party providers of a wide range of same or different goods and services.

Advertising content of website 150 may take many forms. For example, advertising could populate each page of the website 150 including the KPI look up pages and the various centralized website pages. Advertising could be location-based to target the geographical location of areas selected by the user. Advertising could further be content-based to target the type of information related to the navigation trails of the user through the information content of website 150.

As described herein, the wireless network performance software application 142 may serve a variety of purposes. For example, wireless network performance software application 142 may host a website 150, perform averaging calculations, generate additional network performance details related to a location of particular focus, implement "best" wizards for a variety of purposes, mine server 150 for additional data, and many other things.

One example of an averaging calculation used by many features of the wireless network performance software application 142 is a composite score (CS) that can be used to comparatively measure wireless network quality in a variety of ways and amongst a variety of elements. The CS is representative of wireless networking performance quality of a particular mobile device and wireless network user experience, and the CS may be relative to some or all of the available key performance indicators. For example, via the CS, the network quality can be compared between a plurality of wireless network service providers. In another example, the CS can be used to compare network quality over varying geographic parameters. In still another example, the CS is useful to compare wireless network quality over time. Clearly, as will be evident, the CS is useful for many things.

In a preferred embodiment, three composite indicators are combined in an averaging algorithm to form the CS, although more or fewer indicators could be used. A set of geographically based wireless networking performance data is parsed according to the chosen key performance indicators, and the data is used to develop the CS. Also in a preferred embodiment, the CS is created for the smallest measurable geographic area, and multiple CS measurements are mathematically combined to form a composite CS for a larger geographic area of interest.

With respect to the composite indicators, a wide range of measurements and statistical calculations may be made on raw and/or derived data. For example, in some cases, the CS is calculated with a mathematical average (a mean) of measurements taken and recorded by one or more mobile devices. In other cases, different statistical calculations, as known by one skilled in the art, may be used to form the composite indicators. For example, raw or derived data may be created in part or according to a median, a mode, a weighted average, a standard deviation, a variance, and the like.

In the preferred embodiment, a first composite indicator used to calculate the CS is a measure of signal quality in the wireless network 122. Signal quality may be signal strength, signal to noise ratio, or another signal integrity value. The first composite indicator of one embodiment, also called a Signal Quality Index, is illustrated in Equation 1.

$$\text{SignalQualityIndex} = A^*(\text{GridSQ}) \quad (1)$$

Where:
A is a Signal Quality Weighting Factor;
GridSQ is a measure of signal quality in a single, smallest geographic area.

The measure of signal quality, GridSQ, in the Signal Quality Index calculation is relevant to a selectable geographical area. For example, in the geographical map of FIGS. 5a and 5b, an average signal quality may be a mathematical average of measurements made within a single grid or a mathematical average of measurements made over a collection of grids. In this way, signal quality information about a selectable geographical area is chosen. In the preferred embodiment, the measure of signal quality is made for each grid in the area of interest, and a CS is calculated for each grid.

Upon selection of the geographic area, a Signal Quality Weighting Factor is applied to the measure of signal quality. The signal quality weighting factor in a preferred embodiment is determined based on, for example, what a particular user of the CS values. For example, if a user values voice quality, then a particular signal quality weighting factor may be chosen to favor a desirable network signal quality that performs voice communications well. In another example, if a user values Short Messaging Service (SMS) quality, then a different signal quality weighting factor may be chosen to favor a network having a desirable SMS messaging integrity. Accordingly, many factors may be used to determine the signal quality weighting factor.

In the preferred embodiment, a second composite indicator used to calculate the CS is a measure of data quality in the wireless network 122. The second composite indicator, also called a Data Quality Index, may be a weighted determination of how much non-voice traffic can be communicated through the wireless network 122 to a particular mobile device. In some cases, the particular geography, the type of network technology, the time of day, the size of packets, and many other factors impact how much data can be communicated through the network. The second composite indicator of one embodiment, the Data Quality Index, is illustrated in Equation 2.

$$DataQualityIndex = B*(TTPoints/TotalPoints) + C*(AvgDS/MaxDS) \quad (2)$$

Where:

B is a Data Type Weighting Factor;

TTPoints, or Technology Type Points, is a count of data measurements taken for each of the several Technology Types of cellular technologies in the total area of interest;

TotalPoints is a count of data measurements taken for all of the several types of cellular technologies in the total area of interest;

C is a Data Speed Weighting Factor;

AvgDS, or Average Data Speed, is a calculated average data transfer speed based on measurements taken in the total area of interest;

MaxDS, or Maximum Data Speed, is a calculated average of a maximum data speed for the total area of interest.

The Technology Type Points in the Data Quality Index calculation is relevant to a total selectable geographical area. For example, in the geographical map of FIGS. 5a and 5b, a particular grid represents a smallest measurable geographic area. As empirically determined, the cellular communication characteristics of one grid may provide information to predict the characteristics of neighboring grids (i.e., larger geographic areas). For example, it has been determined that a cellular network operating with third generation technology (3G) transfers data faster than an area operating with second generation cellular technology (2G). It has also been determined that in an area operating with both 3G and 2G technology, the data speed may be very greatly impacted in ways that are not generally predictable or expected. Accordingly, in one embodiment, the TTPoints measurement is a difference between all data speed measurements taken in a 3G network and a 2G network taken in ratio to all of the data points measured in the total area of interest.

The TotalPoints element in the Data Quality Index calculation is a count of data measurements taken for all of the several types of cellular technologies in the total area of interest. For example, if two million data tests are run in a particular area on a 3G network and three million data tests are run in the same particular area on a 2G network, the TotalPoints element would be five million.

In the first part of the Data Quality Index calculation, it is observable that the ratio between data points of one type of cellular technology and other types of cellular technology are calculated.

Upon calculation of the data type, or technology type, ratio, a data type weighting factor is applied to the ratio. The data type weighting factor in a preferred embodiment is determined, as described above, based on the number and type of different cellular data technologies operating in the selected total area of interest. For example, in some networks, it has been observed that data transfer operations in a 2G network execute more rapidly than in a mixed 2G and 3G network. Similar empirical observations can be made with a wide variety of cellular technologies and combinations. Accordingly, the data type weighting index can be chosen to account for a wide variety of conditions.

The Average Data Speed in the Data Quality Index calculation in a preferred embodiment represents the average of all data transfers in the area of interest without respect to technology type. In some embodiments, thousands and millions of data speed tests are executed in the smallest measurable geographic areas. In such embodiments, the average data transfer speed for the smallest measurable geographic area is combined and averaged with all of the other data speed averages (per smallest measurable geographic area) in the total area of interest.

The Maximum Data Speed element in the Data Quality Index calculation is a global, statistically determined, maximum data speed for the total area of interest. For example, as discussed with respect to different cellular technologies, some configurations of networks and devices perform better than others. By empirically measuring or predictably calculating, a maximum expected data speed in the total area of interest is determined. The ratio of average data speed and maximum data speed is then calculated.

A Data Speed Weighting Factor is then combined with the average data speed/maximum data speed ratio. The data speed weighting factor is useful for adjusting the relative weight of the data speed ratio in the CS calculation. For example, emerging technologies that may be in testing modes, actual measurements that have been skewed for known reasons, packet sizes, and the particular intrinsic value placed on data traffic speed within the CS calculation are each potential factors in the choice of data speed weighting factor.

A third composite indicator used in a preferred embodiment to calculate the CS is a measure of network reliability in the wireless network 122. The third composite indicator, the Network Reliability Index, may be a weighted determination of the likelihood of encountering errors on the wireless network 122. For example, how often a particular mobile device shows "no bars" to indicate an unavailable network is generally important to a determination of network quality. Additionally, the number of errors encountered when transferring data packets, the number of digitized voice packets that are dropped and account for poor voice quality, and the number of times a relatively stationary mobile device nevertheless switches between servicing cell towers are all factors used to determine network reliability. A third composite indicator, the Network Reliability Index, of one preferred embodiment of a CS calculation is illustrated in Equation 3.

$$NetworkReliabilityIndex = D*(R1/NDC) + E*(R2/ZS) + F*(R3/SS) \quad (3)$$

Where:

D is a No-Data Connect Weighting Factor;

R1 is a global average No Data Connect Error Rate;

NDC is a No Data Connect Error Rate in the total area of interest;

E is a Zero-Signal Weighting Factor;

R2 is a global average Zero Signal Error Rate;

ZS is a Zero Signal Error Rate in the total area of interest

F is a Swing-Signal Weighting Factor;

R2 is a global average Swing-Signal Error Rate;

SS is a Swing-Signal Error Rate in the total area of interest.

The global average No-Data-Connect Error Rate, R1, in the Network Reliability Index calculation is relevant to a total selectable geographical area. Generally, a no-data-connect condition occurs when a mobile device can associate with a particular network, but the mobile device is unable to connect to services sufficiently robust to actually transfer data. In a preferred embodiment, R1 is a "national average" of an expected number of no-data-connect errors for a given geographic area; however a different average could be used in other cases. For example, a time component over which to measure errors could be considered, a particular technology type could be considered, a type of geography could be considered, and many others.

In ratio with the global No-Data-Connect Error Rate, a No-Data-Connect Error rate, NDC, measured in the total area of interest is considered. In the preferred embodiment, the ratio of measured no-data-connect errors NDC to the global average R1 is weighted with a No-Data-Connect Weighting Factor D.

In a second element of the Network Reliability Index, a global average Zero-Signal-Error Rate, R2, in the Network Reliability Index calculation is processed. The Zero-Signal-Error Rate, R2, is relevant to a total selectable geographical area. Generally, a zero-signal-error condition occurs when a mobile device cannot even associate with a particular network. In some cases, the mobile device cannot even detect the presence of a wireless network. In some embodiments, R2 is a "national average" of an expected number of zero-signal-error conditions for a given geographic area, but different averages could also be used. For example, a time component over which to measure errors could be considered, a threshold of signal detectability could be considered, known anomalies in geography or network characteristics could be taken into account, or the like.

In ratio with the global Zero-Signal-Error Rate, R2, a Zero-Signal-Error Rate, ZS, measured in the total area of interest is considered. In the preferred embodiment, the ratio of measured zero-signal-errors ZS to the global average R2 is weighted with a Zero Signal Weighting Factor E.

A third element of the Network Reliability Index in the preferred embodiment is also processed. A global average Swing Signal Error Rate, R3, in the Network Reliability Index calculation is relevant to a total selectable geographical area. Generally, the swing signal condition is a factor accounting for a particular mobile device quickly associating between two or more cell towers. This condition can occur for many reasons, including as a result of geography or atmospheric conditions. In other cases, the swing condition occurs as a cell tower begins to reach saturation in manageable traffic and so adjusts its power output. In still other cases, a swing condition occurs as a result of physical motion of the mobile device. In some embodiments, R3 is a "national average" of an expected number of swing signal conditions for a given geographic area, but different averages could also be used. For example, a time component over which to measure errors could be considered, a density threshold of population or traffic could be considered, or other network factors could be taken into account.

In ratio with the global Swing Signal Error Rate, R3, a Swing Signal Error Rate, SS, measured in the total area of interest is considered. In the preferred embodiment, the ratio of measured swing signal errors SS to the global average R3 is weighted with a Swing Signal Weighting Factor F.

The weighting factors used in the Network Reliability Index calculation, D, E, F, can be adjusted or predetermined for a wide variety of factors. In some cases, the factors are based on measured, empirical data, and in other cases, the adjustments can be made based on network quality characteristics prioritized by a user.

In a preferred embodiment, the CS is calculated as a summation of the three composite indexes discussed herein. A preferred embodiment CS is illustrated in Equation 4.

$$CS = SignalQualityIndex + DataQualityIndex + NetworkReliabilityIndex \quad (4)$$

Other factors could be used to calculate the CS for a small or large geographic area, and/or the composite indexes could be combined in many ways. For example, in some cases, the CS is normalized to always produce a result in the range of 1 to 10. In additional cases, the CS is formatted for output to a display or other computing device.

By normalizing CS calculations, a user of the network performance software application 142 can very easily compare network quality between various network service providers and over various large and small geographical locations. In addition, the user can compare the different voice and data services provided by the various network providers using CS calculations produced with an even-handed, unbiased test methodology.

In another embodiment, website 150 provides some or all of the content described herein, but additionally or alternatively, wireless network performance software application 142 presents another interface for outputting screen data, audio data, and other interactive or static information. For example, a dashboard interface may be presented. The dashboard, conventionally known to one skilled in the art, creates screen data that represents a solid or semi-transparent window on a display to present particular information. In some cases, the dashboard is displayed on a local computer, and in other cases, the dashboard is presented on a computer communicatively located within a private local area network (LAN) or the like. That is, all interaction with website 150 can be from a single computer or from a serving host computer and a remote user computer.

A dashboard interface, like a website, provides an interactive facility whereby a user can retrieve data, input control information, and/or direct how data will be presented. The dashboard interface may be a standalone interface application or may be presented within another software application (e.g., a browser).

In still another embodiment, wireless network performance software application 142, directly or cooperatively with website 150, presents network performance data to another computer in a known or proprietary format. For example, the data used to populate website 150 may be streamed. In cases where the data is streamed, one or more receiving computers are capable of parsing the data stream and processing the information presented within. The information often includes real time network performance data in either a raw format or as processed by the wireless network performance software application 142.

In some cases, a receiving computer provides input to web server 126 to direct the streaming. The input may provide geographic or other indicators that direct the wireless network performance software application 142 to provide data related to the requested indicators.

In still other embodiments, significant quantities of post-processed user quality data are provided by the wireless network performance software application 142. The post-processed data is generally retrieved from a local memory; however, the data in local memory is often derived from raw data stored on server 120. The data provided may include particular KPIs, particular "best supplier" data, or the like. The data may be in a predefined format so that the receiving device can rebuild all or part of a database or other memory structure maintained by the wireless network performance software application 142.

Figure 6:
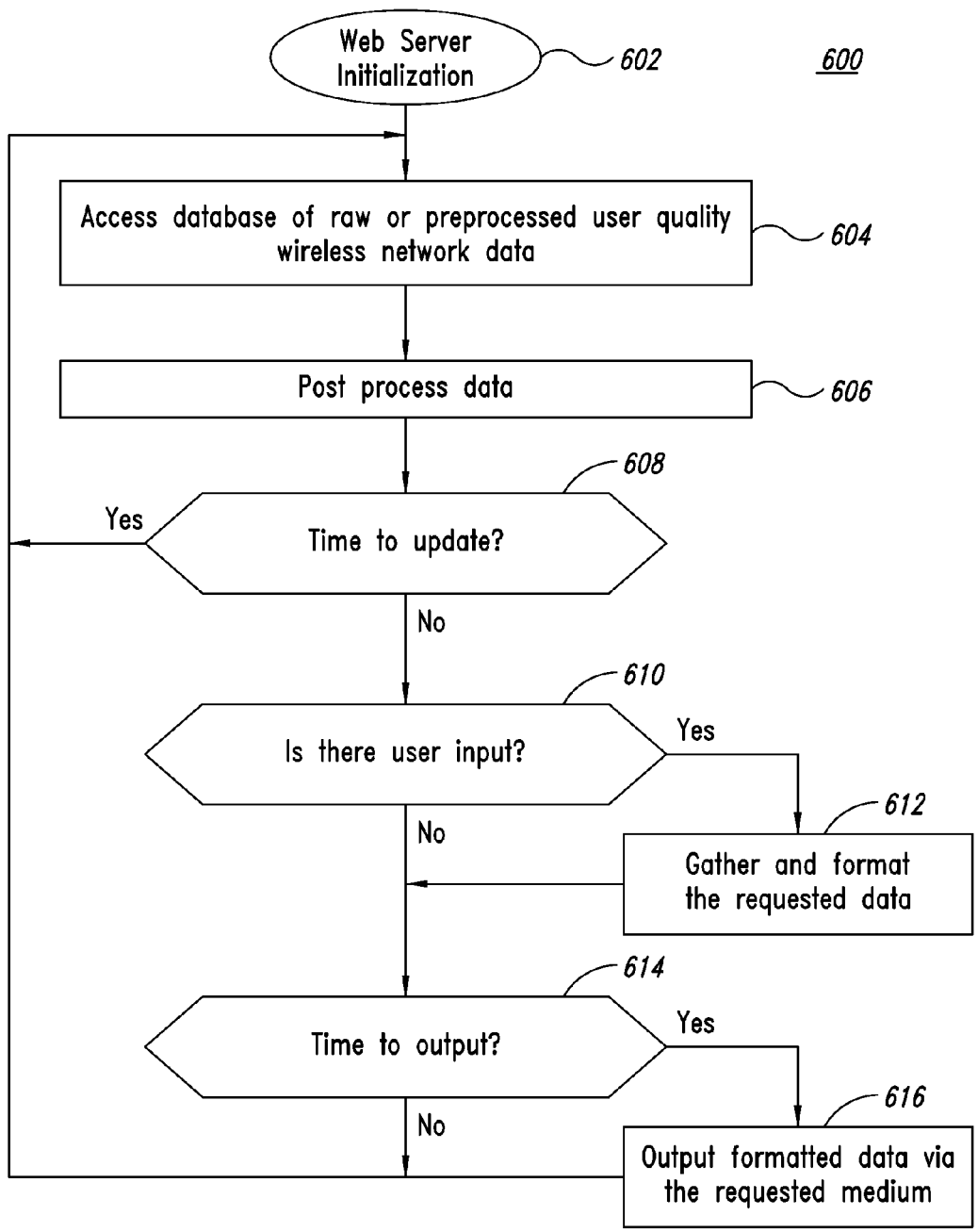
FIG. 6 is a flowchart illustrating a process used by a webserver embodiment.

FIG. 6 is a flowchart 600 illustrating processes that may be used by embodiments of the web server used for the presentation network performance data. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 6, the process 600 is ongoing with operation of the web server 126, and is illustrated as starting at 602 when web-server 126 initializes. At 604, a database of raw or pre-processed user quality wireless network data is accessed, and at 606, the data undergoes additional processing, or post-processing. If it is time to update at 608, then the process returns to retrieve more data to 604. If it is not time to update, then at 610, a user input condition is interrogated. If user input is found, the user-requested data is gathered and formatted at 612. If the formatted and/or post processed data is ready for output at 614, then the formatted data is output via the requested medium at 616. The process 600 does not typically end, but instead, cyclically returns to receive and/or retrieve a new batch of raw or pre-processed data at 604.

Figure 6A:
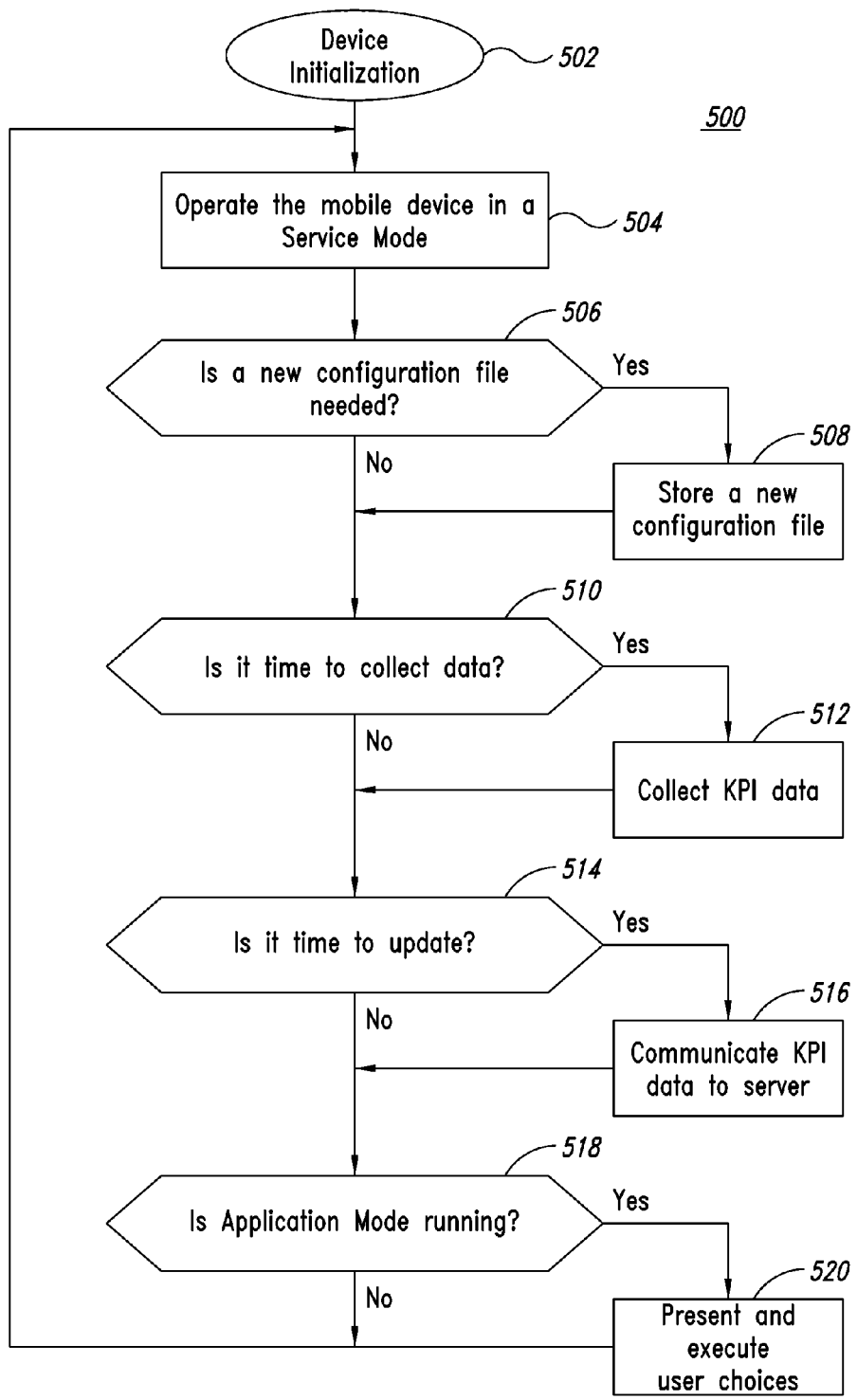
FIG. 6A is a flowchart illustrating a process used by a mobile device embodiment.

FIG. 6A is a flowchart 500 illustrating processes that may be used by embodiments of the mobile device used for collecting network performance data. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 6A, the process 500 is ongoing with operation of the mobile device 118a-d, and is illustrated as starting at 502 when the mobile device 118a-d initializes. At 504, operation of the mobile device 118a-d begins in a Service Mode. If a configuration file is to be loaded at 506, then the new configuration file is stored at 508. When the mobile device 118a-d is directed to collect data at 510, a set of one or more KPI data are collected at 512. The process determines if a server 120 is to be updated with collected KPI data at 514, and if so, the update is performed at 516. If the Application Mode is to be invoked at 518, then the Application Mode presents user choices at 520. The process 500 does not typically end, but instead, cyclically returns to the Service Mode operation at 504.

Figure 6B:
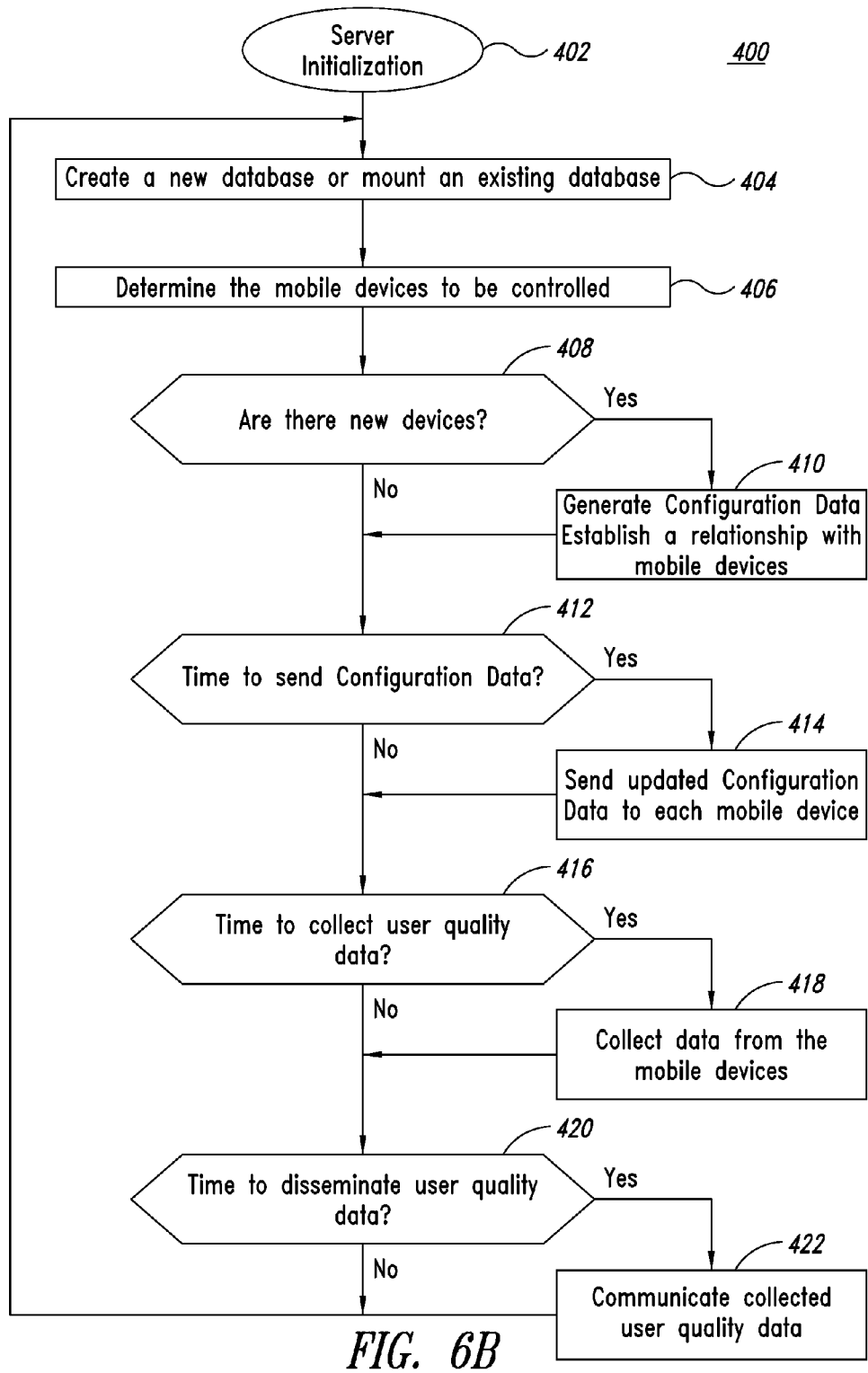
FIG. 6B is a flowchart illustrating one embodiment of a process used by the computing server.

FIG. 6B is a flowchart 400 illustrating processes that may be used by embodiments of the server used for directing the collection and retrieval of network performance data. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 6B, the process 400 is ongoing with operation of the server 120, and is illustrated as starting at 402 when server 120 initializes. At 404, operation of server 120 begins by creating a new database or mounting an existing database. Next, at 406, the number and identity of mobile devices 118a-d already in the network performance measurement system 110 are determined. If there are new mobile devices 118a-d in the network performance measurement system 110 at 408, then configuration data (e.g., a configuration file) is created and a relationship is established between server 120 and each new mobile device 118a-d at 410.

At 412, server 120 determines if it is time to send configuration data to mobile devices 118a-d or if mobile devices have requested new configuration data, and if so, the updated configuration data is sent to the mobile devices 118a-d. Next, at 416, server 120 determines if data is to be collected from mobile devices 118a-d, and if so, the data is collected at 418.

Finally, server 120 determines if the collected user quality data measurements are to be disseminated at 420. If the data is to be disseminated, the collected data is communicated to another server or application at 422. The process 400 does not typically end, but instead, cyclically returns to the new devices interrogation operation at 408.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of processing wireless networking performance data, comprising:
retrieving a set of geographically based wireless networking performance data from a first computing device, the set of geographically based wireless networking performance data derived from at least one mobile device provisioned for typical operation on a wireless communication network;
parsing the set of geographically based wireless networking performance data according to a set of key performance indicators; and
calculating a geographically based composite score representative of wireless networking performance quality from at least some of the key performance indicators, the composite score formulated by mathematically combining a plurality of factors including a signal quality factor, a data quality factor, and a network reliability factor, the signal quality factor including a signal quality weighting factor, the data quality factor including a data type weighting factor and a data speed weighting factor, and the network reliability factor including a no-data connect weighting factor and a zero-signal weighting factor, each of said plurality of factors associated with a same geographic area; and
formatting the composite score for display on an output device.

2. The method of processing wireless networking performance data of claim 1, further comprising:
communicating the formatted composite score to a second computing device.

3. The method of processing wireless networking performance data of claim 1, further comprising:
displaying the formatted composite score.

4. The method of processing wireless networking performance data of claim 1, further comprising:
retrieving a second set of geographically based wireless networking performance data from the first computing device, the second set of geographically based wireless networking performance data derived from at least one mobile device provisioned for typical operation on a second wireless communication network;

calculating a second geographically based composite score representative of wireless networking performance quality from at least some of the key performance indicators; and formatting the second composite score for display on the output device.

5. The method of processing wireless networking performance data of claim 4, further comprising:

comparing the geographically based composite score and the second geographically based composite score; and formatting the results of the comparing for display on the output device.

6. The method of processing wireless networking performance data of claim 5 wherein the wireless communication network is a first wide area wireless telecom network configured to provide wireless telecom service to a plurality of mobile devices in a metropolitan area and the second wireless communication network is a second wide area wireless telecom network configured to provide wireless telecom service to a second plurality of mobile devices in the metropolitan area, the wide area wireless communication network distinct from the second wireless communication network.

7. The method of processing wireless networking performance data of claim 4 wherein the wireless communication network is a first wireless telecom network configured to provide wireless telecom service to a plurality of mobile devices in a metropolitan area and the second wireless communication network is a second wireless telecom network configured to provide wireless telecom service to a second plurality of mobile devices in the metropolitan area, the wireless communication network distinct from the second wireless communication network.

8. The method of processing wireless networking performance data of claim 1 wherein the set of geographically based wireless networking performance data was collected from the at least one mobile device during a particular time period.

9. The method of processing wireless networking performance data of claim 1 wherein the composite score is formed as a single value representative of overall quality of the wireless communication network, the composite score configured for comparison to a second composite score, the second composite score formed as a single value representative of overall quality of a second wireless communication network.

10. The method of processing wireless networking performance data of claim 1, further comprising:

calculating the geographically based composite score by mathematically combining the plurality of factors including the network reliability factor including a swing-signal weighting factor.

11. A computing server, comprising:

a central processing unit (CPU);

an input/output port;

a memory associated with the computing server, the memory configured to store a software application, the software application configured to:

receive, via the input/output port, a set of key performance indicators representative of at least one user experience of a mobile device previously operated in an identified geographic location on a wireless communication network;

calculate with the CPU, a geographically based composite score representative of wireless networking performance quality from at least some of the key performance indicators in the set, the composite score formulated by mathematically combining a plurality of factors including a signal quality factor, a data quality factor, and a network reliability factor, the signal quality factor including a signal quality weighting factor, the data quality factor including a data type weighting factor and a data speed weighting factor, and the network reliability factor including a no-data connect weighting factor and a zero-signal weighting factor, each of said plurality of factors associated with a same geographic area; and format the composite score for output.

12. The computing server of claim 11 wherein the set of key performance indicators includes network signal strength, data transfer speed, data latency, and a measurement of dropped calls.

* * * * *